United States Patent
Jang et al.

(10) Patent No.: US 10,745,009 B2
(45) Date of Patent: Aug. 18, 2020

(54) ELECTRONIC APPARATUS FOR DETERMINING A DANGEROUS SITUATION OF A VEHICLE AND METHOD OF OPERATING THE SAME

(71) Applicant: Samsung Electronics Co., Ltd., Suwon-si, Gyeonggi-do (KR)

(72) Inventors: Jun-Ik Jang, Bucheon-si (KR); Ye-Hoon Kim, Seoul (KR); So-jung Yun, Seoul (KR); Jin-ho Lee, Suwon-si (KR); Do-jun Yang, Yongin-si (KR); Han-sung Lee, Yongin-si (KR); Soon-hyuk Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/848,901

(22) Filed: Dec. 20, 2017

(65) Prior Publication Data

US 2018/0170375 A1 Jun. 21, 2018

(30) Foreign Application Priority Data

Dec. 21, 2016 (KR) .................. 10-2016-0175840
Oct. 18, 2017 (KR) .................. 10-2017-0135233

(51) Int. Cl.
*B60W 30/095* (2012.01)
*B60W 50/14* (2020.01)
(Continued)

(52) U.S. Cl.
CPC ......... *B60W 30/0956* (2013.01); *B60K 28/06* (2013.01); *B60W 50/14* (2013.01);
(Continued)

(58) Field of Classification Search
CPC ............ B60W 30/0956; B60W 50/14; B60W 2050/146; G06K 9/00845; G06K 9/00832;
(Continued)

(56) References Cited

U.S. PATENT DOCUMENTS 6,243,015 B1   6/2001  Yeo
6,812,888 B2 * 11/2004  Drury ................ G01C 21/3415
                                               342/357.31

(Continued)

FOREIGN PATENT DOCUMENTS

GB        2528084 A      1/2016
KR    10-2016-0050709 A  5/2016
(Continued)

OTHER PUBLICATIONS

European Search Report dated Jan. 24, 2020; European Appln. No. 17884533.5-1012/3539113 PCT/KR2017015104.

*Primary Examiner* — Richard A Goldman
(74) *Attorney, Agent, or Firm* — Jefferson IP Law, LLP

(57) ABSTRACT

An electronic apparatus is provided. The electronic apparatus includes at least one processor configured to detect, by a sensor, a driving state of a vehicle or a driving state of another vehicle in a vicinity of the vehicle while the vehicle is being driven, obtain state data including the driving state of the vehicle and the driving state of the other vehicle, and use at least one data recognition model to determine a dangerous situation of the vehicle after a certain period of time while the vehicle is being driven, based on the obtained state data. The electronic apparatus may predict a dangerous situation of the vehicle by using a rule-based algorithm or an artificial intelligence (AI) algorithm. The electronic appara-
(Continued)

tus predicts the dangerous situation of the vehicle by using at least one of machine learning, a neural network, and a deep learning algorithm.

20 Claims, 30 Drawing Sheets

(51) Int. Cl.
| | | |
|---|---|---|
| *G06N 3/08* | (2006.01) | |
| *G06K 9/00* | (2006.01) | |
| *B60K 28/06* | (2006.01) | |
| *B60W 50/00* | (2006.01) | |
| *B60W 40/08* | (2012.01) | |
| *G06N 3/04* | (2006.01) | |

(52) U.S. Cl.
CPC ..... *G06K 9/00791* (2013.01); *G06K 9/00805* (2013.01); *G06K 9/00845* (2013.01); *G06N 3/08* (2013.01); *G06N 3/084* (2013.01); *B60W 2040/0818* (2013.01); *B60W 2050/0071* (2013.01); *B60W 2050/146* (2013.01); *B60W 2420/42* (2013.01); *B60W 2520/10* (2013.01); *B60W 2520/105* (2013.01); *G06N 3/04* (2013.01)

(58) Field of Classification Search
CPC .. G06N 3/146; G06N 3/08; G05D 2201/0213; G05D 1/0061; G05D 1/0088; G05D 1/0231; B60K 2370/1529; B60K 2370/193; B60K 2370/194; B60K 28/02; B60K 28/10
USPC ............................ 701/301, 117, 23, 25, 29.3
See application file for complete search history.

(56) References Cited

U.S. PATENT DOCUMENTS

| | | | | |
|---|---|---|---|---|
| 7,979,173 | B2* | 7/2011 | Breed | G01S 17/86 701/23 |
| 10,048,700 | B1* | 8/2018 | Curlander | G05D 1/0297 |
| 10,388,084 | B1* | 8/2019 | Chan | G06K 9/00791 |
| 2003/0039123 | A1* | 2/2003 | Crisick | B60Q 1/52 362/464 |
| 2010/0174544 | A1* | 7/2010 | Heifets | H04M 3/4938 704/260 |
| 2013/0069773 | A1* | 3/2013 | Li | B60W 40/09 340/426.1 |
| 2013/0073139 | A1* | 3/2013 | Henry | G07C 5/00 701/29.3 |
| 2013/0135092 | A1 | 5/2013 | Wu et al. | |
| 2014/0184797 | A1 | 7/2014 | Ko et al. | |
| 2014/0236414 | A1 | 8/2014 | Droz et al. | |
| 2015/0345971 | A1* | 12/2015 | Meuleau | G05D 1/0217 701/25 |
| 2015/0349917 | A1* | 12/2015 | Skaaksrud | H04H 20/71 370/328 |
| 2016/0009279 | A1 | 1/2016 | Jimaa et al. | |
| 2016/0101732 | A1 | 4/2016 | Danz | |
| 2016/0167675 | A1 | 6/2016 | Peng | |
| 2016/0178802 | A1* | 6/2016 | Stainvas Olshansky | G01W 1/10 356/341 |
| 2016/0297433 | A1* | 10/2016 | Cosatto | B60W 10/04 |
| 2017/0140232 | A1* | 5/2017 | Banno | A61B 5/1114 |
| 2017/0325732 | A1 | 11/2017 | Kodama et al. | |
| 2018/0056851 | A1* | 3/2018 | Kim | G05D 1/0088 |
| 2018/0111628 | A1* | 4/2018 | Tamagaki | G05D 1/0061 |
| 2018/0354419 | A1* | 12/2018 | Choi | H04N 5/445 |
| 2018/0362053 | A1* | 12/2018 | Isa | G06K 9/00845 |
| 2019/0135311 | A1* | 5/2019 | Zarella | B61C 17/12 |
| 2019/0180126 | A1* | 6/2019 | Kinoshita | G06K 9/00255 |
| 2019/0185009 | A1* | 6/2019 | Werner | G06N 20/20 |
| 2019/0197889 | A1* | 6/2019 | Kanehara | G08G 1/054 |

FOREIGN PATENT DOCUMENTS

| | | |
|---|---|---|
| KR | 10-2016-0069880 A | 6/2016 |
| KR | 10-2016-0079497 A | 7/2016 |
| WO | 2011/042876 A1 | 4/2011 |
| WO | 2011/075392 A1 | 6/2011 |
| WO | 2016/103468 A1 | 6/2016 |

* cited by examiner

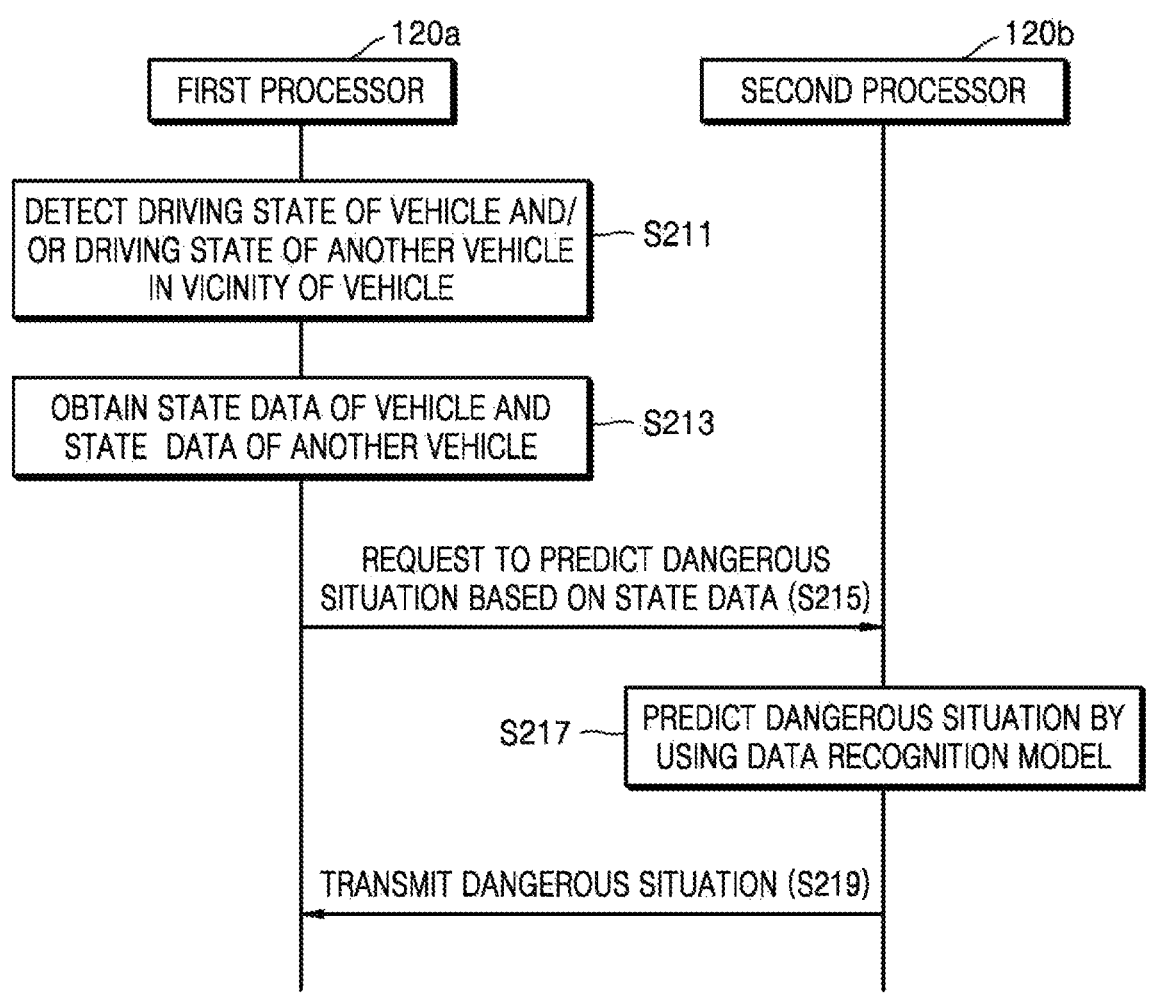

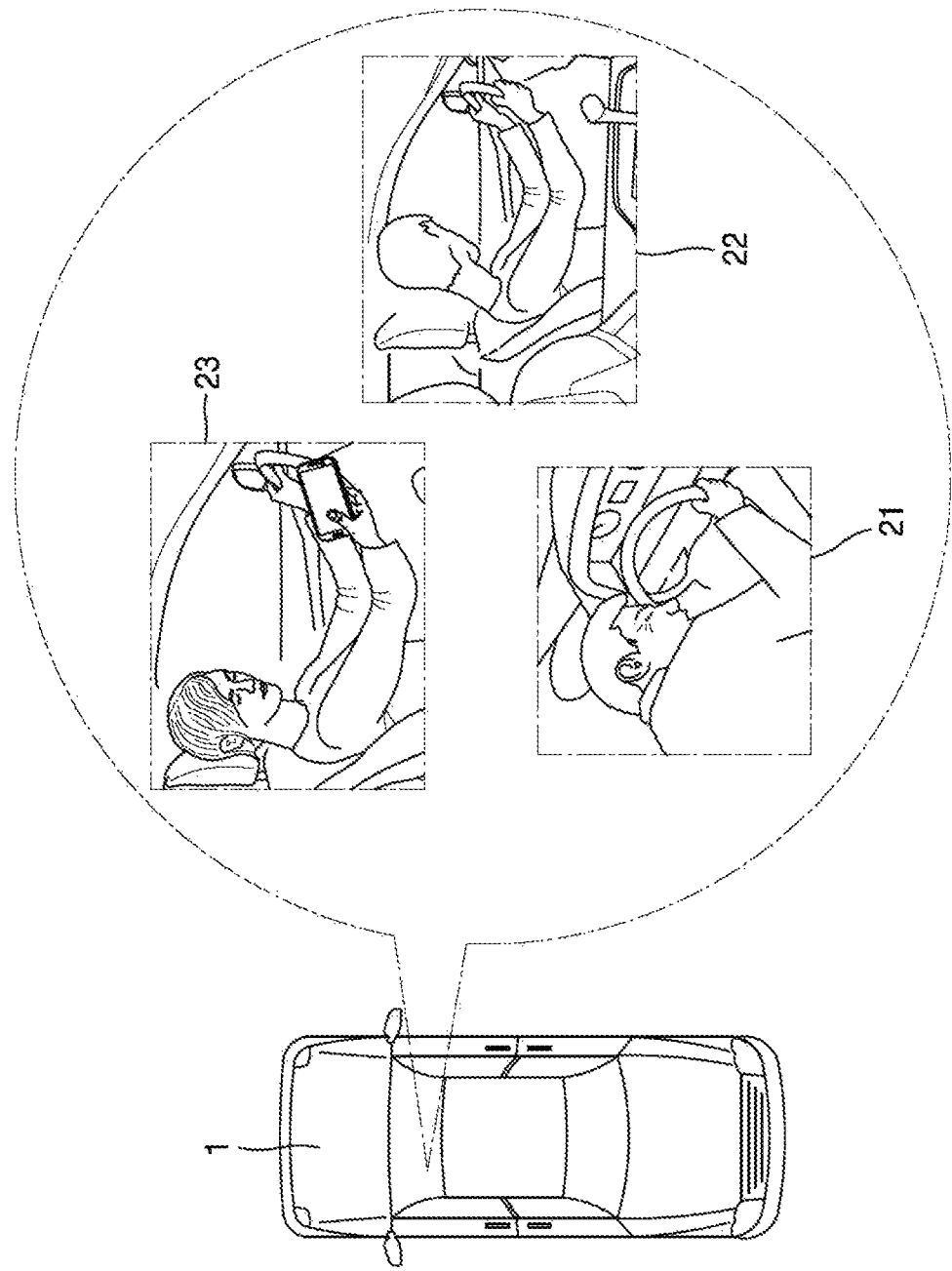

FIG. 6
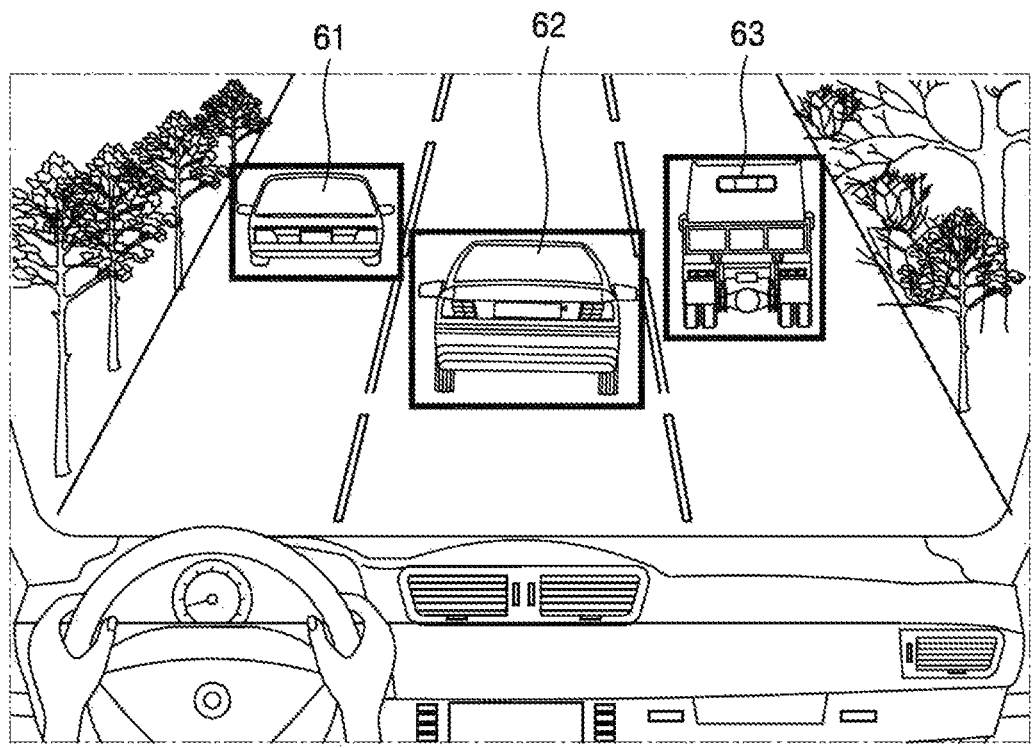
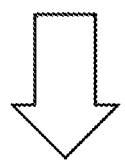
| MODEL | YEAR | DISTANCE | WEIGHT | ACCIDENT RATE | DRIVING SPEED | |
|-------|------|----------|--------|---------------|---------------|---|
| AA | 2014 | 3m | 1.3t | 3% | 5km/h | ... |
| BB | 2002 | 4m | 1.5t | 12% | 11km/h | ... |
| CC | 2008 | 8m | 1.8t | 6% | 30km/h | ... |

ELECTRONIC APPARATUS FOR DETERMINING A DANGEROUS SITUATION OF A VEHICLE AND METHOD OF OPERATING THE SAME

CROSS-REFERENCE TO RELATED APPLICATION(S)

This application claims the benefit under 35 U.S.C. § 119(a) of a Korean patent application filed on Dec. 21, 2016 in the Korean Intellectual Property Office and assigned Serial number 10-2016-0175840, and of a Korean patent application filed on Oct. 18, 2017 in the Korean Intellectual Property Office and assigned Serial number 10-2017-0135233, the entire disclosure of each of which are hereby incorporated by reference.

TECHNICAL FIELD

The present disclosure relates to an electronic apparatus and a method of operating the same. More particularly, the present disclosure relates to an electronic apparatus and a method of assisting with driving of a vehicle.

Also, the present disclosure relates to an artificial intelligence (AI) system for copying functions of a human brain, for example, recognition, judgment, etc., by using a machine learning algorithm such as deep learning, and an application technique of the AI system.

BACKGROUND

An artificial intelligence (AI) system is a computer system capable of simulating human intelligence. Unlike an existing rule-based smart system, the AI system is self-taught, makes decisions by itself, and gets smarter over time. When the AI system is frequently used, the AI system has an increased recognition rate and trains user preference more accurately. Thus, existing rule-based smart systems are gradually being replaced with deep learning-based AI systems.

AI technology includes machine learning (deep learning) and element technologies utilizing the machine learning.

Machine learning is an algorithm technique for self-classifying/learning characteristics of input data. An element technique is a technique of using a machine learning algorithm such as deep learning so as to copy functions, e.g., recognition, judgment, etc. of a human brain, and includes various technical fields such as linguistic understanding, visual understanding, reasoning/prediction, knowledge representation, and motion control.

The AI technology is applied to various fields. Linguistic understanding is a technique for recognizing and applying/processing language/characters of people and includes natural language processing, machine translation, a communication system, questions and answers, voice recognition/synthesis, and the like. Visual understanding is a technique for recognizing and processing objects in the manner of human vision, and includes object recognition, object tracking, image retrieval, human recognition, scene understanding, space understating, image improvement, and the like. Reasoning/prediction is a technique for logically determining and then reasoning and predicting information and includes knowledge/probability-based reasoning, optimization prediction, preference-based planning, recommendation, and the like. Knowledge representation is a technique of automating human experience information into knowledge data and includes knowledge construction (data generation/classification), knowledge management (data utilization), and the like. Motion control is a technique for controlling autonomous driving of a vehicle and motions of robots and includes motion control (navigation, collision, and driving), manipulation control (behavior control), and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus and a method of assisting with driving of a vehicle. Also, provided is a non-transitory computer-readable recording medium having recorded thereon a program which, when executed by a computer, performs the above method. Technical goals of the present disclosure are not limited thereto, and there may be other technical goals.

Additional aspects will be set forth in part in the description which follows and, in part, will be apparent from the description, or may be learned by practice of the presented embodiments.

In accordance with an aspect of the present disclosure, an electronic apparatus is provided. The electronic apparatus includes a sensor configured to detect at least one of a driving state of a vehicle and a driving state of another vehicle in a vicinity of the vehicle while the vehicle is being driven, a memory configured to store at least one instruction, and at least one processor configured to execute the at least one instruction stored in the memory. By executing the at least one instruction, the at least one processor is further configured to obtain state data including at least one of the driving state of the vehicle and the driving state of the other vehicle in the vicinity of the vehicle, and use at least one data recognition model to determine a dangerous situation of the vehicle after a certain period of time while the vehicle is being driven, based on the obtained state data.

In accordance with another aspect of the present disclosure, a method of operating an electronic apparatus is provided. The method includes detecting at least one of a driving state of a vehicle and a driving state of another vehicle in a vicinity of the vehicle while the vehicle is being driven, obtaining state data including at least one of the driving state of the vehicle and the driving state of the other vehicle in the vicinity of the vehicle, and using at least one data recognition model to determine a dangerous situation of the vehicle after a certain period of time while the vehicle is being driven, based on the obtained state data.

According to an aspect of another embodiment, a non-transitory computer-readable recording medium has recorded thereon a program which, when executed by a computer, performs the above method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2B is a flowchart for explaining a situation in which a first processor and a second processor predict a dangerous situation of a vehicle, according to an embodiment of the present disclosure;

FIGS. 3 and 4 illustrate states of drivers who drive vehicles, according to an embodiment of the present disclosure;

FIG. 6 is a diagram for explaining vehicle information of other vehicles in a vicinity of a vehicle, according to an embodiment of the present disclosure;

Throughout the drawings, it should be noted that like reference numbers are used to depict the same or similar elements, features, and structures.

DETAILED DESCRIPTION

Figure 1:
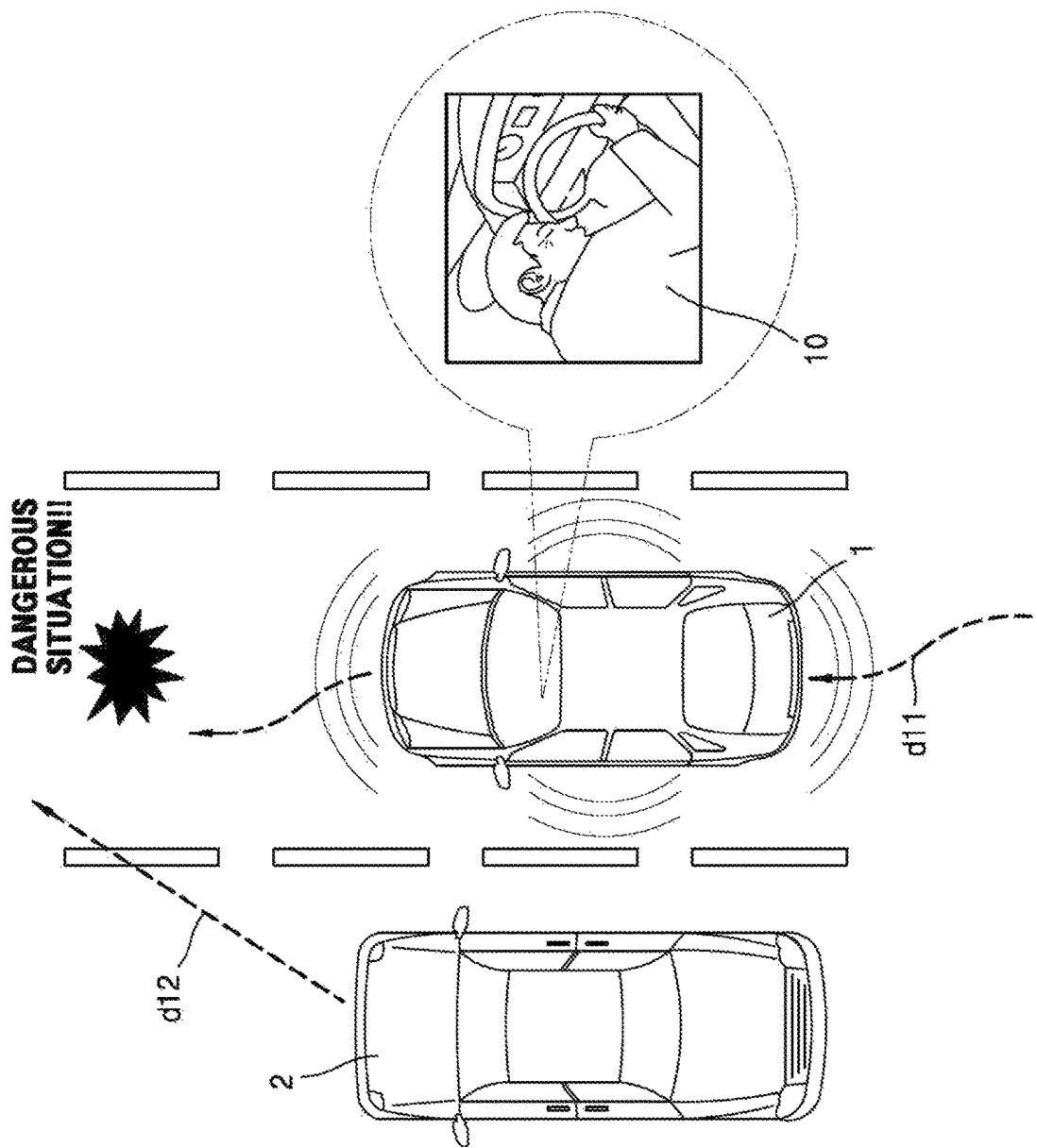
FIG. 1 illustrates an example of operating an electronic apparatus for assisting with driving of a vehicle, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a portion "includes" an element, another element may be further included, rather than excluding the existence of the other element, unless otherwise described. Also, the terms "unit", "module", etc. are units for processing at least one function or operation and may be implemented as hardware, software, or a combination of hardware and software.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, the present disclosure will be described in detail by explaining embodiments of the disclosure with reference to the attached drawings.

In the present specification, a vehicle 1 may include an electronic apparatus 100 for assisting with or controlling driving of the vehicle 1 (hereinafter, referred to as the 'electronic apparatus 100').

FIG. 1 illustrates an example of operating the electronic apparatus 100 (refer to FIGS. 15 and 16) for assisting with driving of the vehicle 1, according to an embodiment of the present disclosure.

Referring to FIG. 1, the electronic apparatus 100 according to an embodiment may detect a driving state of a vehicle 1 and a driving state of another vehicle 2 driving in a vicinity of the vehicle 1.

For example, the electronic apparatus 100 may detect a driving pattern d11 in which the vehicle 1 frequently moves left and right while the vehicle 1 is being driven on a straight road. The electronic apparatus 100 may detect that a driver 10 who is driving the vehicle 1 is dozing off. Also, the electronic apparatus 100 may determine a driving intention d12 that the other vehicle 2 driving in the vicinity of the vehicle 1 tries to move in front of the vehicle 1.

Based on the driving states of the vehicles 1 and 2, the electronic apparatus 100 according to an embodiment may predict that a dangerous situation in which the vehicle 1 is about to collide with the vehicle 2 may occur. According to an embodiment, a processor 120 (e.g., at least one processor) (refer to FIGS. 15 and 16) of the electronic apparatus 100 may use a data recognition model based on a neural network so as to predict a dangerous situation based on state data including various states recognized while driving the vehicle 1.

According to an embodiment, the electronic apparatus 100 of the vehicle 1 may predict dangerous situations, which may occur while the vehicle 1 is being driven, may notify the driver about the dangerous situations, and may provide driving guidance information used to prevent the dangerous situations in advance, thereby providing a safe and convenient driving environment to the driver.

Also, according to an embodiment, the electronic apparatus 100 of the vehicle 1 may autonomously control a driving operation by predicting the dangerous situations and thus may provide a relatively safe driving environment. For example, the electronic apparatus 100 may autonomously control a driving operation of the vehicle 1 such as stopping or a direction change and thus may prevent the predicted dangerous situations in advance.

Figure 2A:
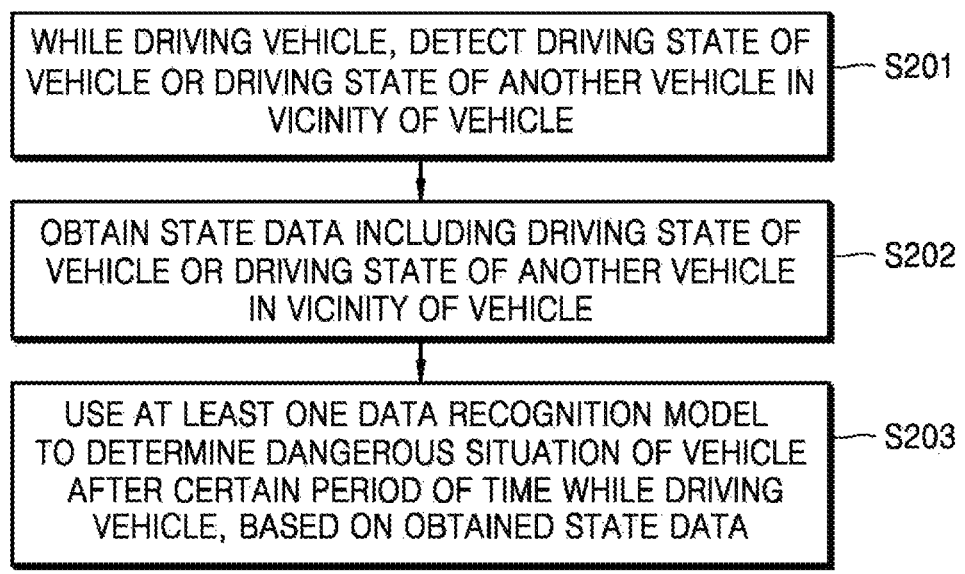
FIG. 2A is a flowchart of a method of operating an electronic apparatus, according to an embodiment of the present disclosure.

FIG. 2A is a flowchart of a method of operating the electronic apparatus 100, according to an embodiment of the present disclosure.

In operation S201 of FIG. 2A, the electronic apparatus 100 according to an embodiment may detect a driving state of a vehicle or a driving state of another vehicle in the vicinity of the vehicle while it is being driven.

Referring to FIG. 2A, the driving state of the vehicle may include a driving speed, driving acceleration, a driving direction, etc. thereof. According to an embodiment, a sensor 110 including an acceleration sensor 231, a gyroscope sensor 234, an inertial measurement unit (IMU) 225 (refer to FIG. 16), and the like may detect the driving speed, the driving acceleration, the driving direction, etc. of the vehicle.

Also, according to an embodiment, the driving state of the other vehicle in the vicinity of the vehicle may include driving patterns, e.g., a driving speed, driving acceleration, a driving direction, a direction change intention, hard braking, and rapid acceleration, etc., of the other vehicle.

According to an embodiment, the sensor 110 including a RADAR sensor 226, a LIDAR sensor 227, an image sensor 228, and the like may detect other vehicles in the vicinity of the vehicle, a road shape, etc. For example, the LIDAR sensor 227 may emit laser beams by using a laser output unit and obtain a reflection signal from an object by using at least one laser receiver, thereby detecting a shape, a distance, a geographical feature, etc. of a neighboring object.

Also, the sensor 110 of the electronic apparatus 100 according to an embodiment may detect weather (e.g., whether there is poor visibility because of snow, rain, or fog, or the like), road conditions (e.g., whether the road is slippery, etc.), road states (e.g., whether road work is ongoing, whether lanes narrow down to one lane, whether the road is one-way, etc.).

In addition, according to an embodiment, the sensor 110 of the electronic apparatus 100 may detect a state of the driver who drives the vehicle.

According to an embodiment, the sensor 110 including the image sensor 228, etc. may detect a facial expression, an eye direction, an action, and the like of the driver. The processor 120 may determine that the driver is dozing off based on the facial expression of the driver which is detected by the image sensor 228. For example, the processor 120 of the electronic apparatus 100 may determine that the driver is dozing off when the driver frequently yawns or a frequency of blinks increases. The state of the driver will be described below in detail with reference to FIGS. 3 and 4.

Also, the sensor 110 of the electronic apparatus 100 according to an embodiment may obtain an image of capturing another vehicle driving in the vicinity of the vehicle. The processor 120 according to an embodiment may obtain vehicle information of the other vehicle from the obtained image. According to an embodiment, the vehicle information may include information about a model, a year, an accident rate, etc. of a vehicle. The vehicle information will be described below in detail with reference to FIG. 6.

According to an embodiment, the processor 120 may use the data recognition model when determining whether the driver is dozing off. When the driver blinks more than a certain number of times within a certain period of time, the processor 120 may allow the data recognition model to be trained by determining that the driver is dozing off. The processor 120 may determine that the driver is dozing off by using the data recognition model.

In operation S202, the processor 120 of the electronic apparatus 100 may obtain state data including the driving state of the vehicle and the driving state of the other vehicle in the vicinity of the vehicle.

The processor 120 of the electronic apparatus 100 according to an embodiment may obtain the state data by combining various states detected at close points in time.

According to an embodiment, the state data may include states regarding driving, which may be detected from the vehicle and surroundings thereof while the vehicle is being driven. The state data according to an embodiment may include the driving state of the vehicle, the state of the driver, the driving state of the other vehicle in the vicinity of the vehicle, the vehicle information of the other vehicle, the surrounding environment state, and the like.

For example, the state data may include a state in which a traffic light, which is located several hundred meters ahead, has turned red and the vehicle does not decelerate at a point in time when the driver of the vehicle is manipulating a smart phone.

In operation S203, the electronic apparatus 100 may use at least one data recognition model and may determine a dangerous situation after a certain period of time while the vehicle is being driven, based on the obtained state data.

For example, when the electronic apparatus 100 detects that the traffic light located several hundred meters ahead has turned red at a point in time when the driver of the vehicle is manipulating the smart phone, if the vehicle does not decelerate, the electronic apparatus 100 may predict that a collision of the vehicle with other vehicles may occur in several seconds.

The processor 120 of the electronic apparatus 100 according to an embodiment may use the at least one data recognition model so as to determine a dangerous situation based on the state data. According to an embodiment, the processor 120 may use a data recognition model based on a neural network such as a deep neural network (DNN) or a recurrent neural network (RNN).

According to an embodiment, as the processor 120 trains the dangerous situation determined based on the state data, the processor 120 may update the data recognition model. Also, when the processor 120 trains the dangerous situation determined based on the state data that is obtained by combining various states detected at close points in time, the processor 120 may update the data recognition model.

According to an embodiment, as the processor 120 of the electronic apparatus 100 predicts the dangerous situation of the vehicle, the processor 120 may notify the driver about the dangerous situation so that the driver may prepare for the dangerous situation, or the processor 120 may directly control the driving operation of the vehicle, thereby providing a safer driving environment to the driver.

FIG. 2B is a flowchart for explaining a situation in which a first processor 120*a* and a second processor 120*b* predict a dangerous situation of a vehicle, according to various embodiment of the present disclosure.

Referring to FIG. 2B, the electronic apparatus 100 may include the first processor 120*a* and the second processor 120*b*.

The first processor 120*a* may control execution of at least one application installed in the electronic apparatus 100 and may perform graphic processing on an image obtained by the electronic apparatus 100. The first processor 120*a* may be implemented as a system on chip (SoC) in which functions of a central processing unit (CPU), a graphics processing unit (GPU), a communication chip, and a sensor are integrated.

The second processor 120*b* may use the data recognition model to predict the dangerous situation from a vehicle that is being driven, a neighboring vehicle, and surrounding environment information and to provide driving guidance information.

The second processor 120*b* may be manufactured in a form of a hardware chip exclusively used for artificial intelligence (AI) that performs a dangerous situation prediction function by using the data recognition model. According to various embodiments, in the case of a data recognition model using visual comprehension as an element technique, the hardware chip exclusively used for the AI may include a GPU.

Also, the electronic apparatus 100 may further include a third processor, a fourth processor, etc., which perform the same function as the second processor 120*b*.

In operation S211, the first processor 120*a* may detect the driving state of the vehicle and/or the driving state of another vehicle in the vicinity of the vehicle. Also, the first processor 120*a* may detect the state of the driver, the vehicle information of the other vehicle, and the surrounding environment information.

According to an embodiment, the first processor 120*a* may detect the driving state of the vehicle, the state of the driver, the driving state of the other vehicle, the vehicle information of the other vehicle, and the surrounding environment information by using the acceleration sensor 231, the gyroscope sensor 234, the IMU 225, the RADAR sensor 226, the LIDAR sensor 227, the image sensor 228, and the like which are included in the electronic apparatus 100.

In operation S213, the first processor 120*a* may obtain the state data of the vehicle and/or the state data of the other vehicle. Also, the first processor 120*a* may obtain state data regarding the state of the driver, the vehicle information of the other vehicle, and/or the surrounding environment information.

The driving state of the vehicle may include, for example, a driving speed, driving acceleration, hard braking, sudden acceleration, and the like. The state of the driver may include, for example, facial expressions, an eye direction, actions, and the like. The driving state of the other vehicle may include, for example, a driving speed, driving acceleration, a driving direction, a direction change intention, hard braking, sudden acceleration, and the like. The vehicle information of the other vehicle may include, for example, a vehicle model, a year, a potential accident rate, a weight, an insurance history, and the like. The surrounding environment information may include, for example, types of lanes on a road, weather conditions, road conditions, an accident-prone area, a road-work area, pedestrians, obstacles, and the like.

In operation S215, the first processor 120*a* may request the second processor 120*b* to predict a dangerous situation based on the obtained state data.

In operation S217, the second processor 120*b* may predict the dangerous situation of the vehicle by using the data recognition model.

For example, the first processor 120*a* may transmit, to the second processor 120*b*, state data indicating that the driver is manipulating the smart phone, and state data indicating that a traffic light in front of the vehicle has turned red. The second processor 120*b* may use the data recognition model to predict a collision risk based on the state data regarding the driver and the traffic light.

In operation S219, the second processor 120*b* may transmit the predicted dangerous situation to the first processor 120*a*.

Figure 2C:
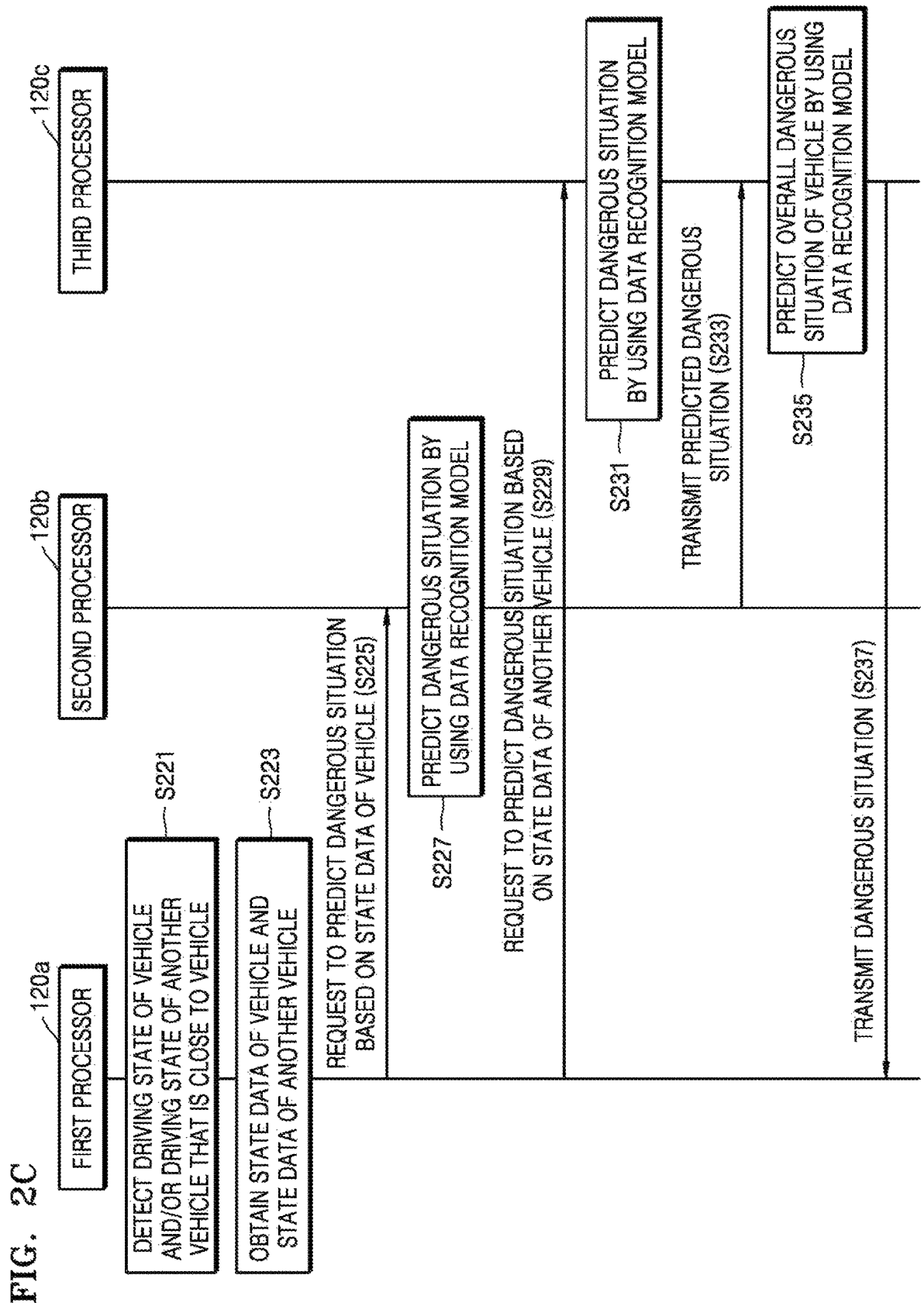
FIG. 2C is a flowchart for explaining a situation in which a first processor, a second processor, and a third processor predict a dangerous situation of a vehicle, according to an embodiment of the present disclosure.

FIG. 2C is a flowchart for explaining a situation in which the first processor 120*a*, the second processor 120*b*, and a third processor 120*c* predict a dangerous situation of a vehicle, according to embodiment of the present disclosure.

Referring to FIG. 2C, the electronic apparatus 100 may include the first processor 120*a*, the second processor 120*b*, and the third processor 120*c*. The third processor 120*c* may select the driving guidance information based on the dangerous situation, by using the data recognition model.

In operation S221, the first processor 120a may detect the driving state of the vehicle, the state of the driver, the driving state of the other vehicle, the vehicle information of the other vehicle, and the surrounding environment information by using the acceleration sensor 231, the gyroscope sensor 234, the IMU 225, the RADAR sensor 226, the LIDAR sensor 227, the image sensor 228, and the like which are included in the electronic apparatus 100.

In operation S223, the first processor 120a may obtain the state data of the vehicle and/or the state data of the other vehicle. Also, the first processor 120a may obtain the state data regarding the state of the driver, the vehicle information of the other vehicle, and/or the surrounding environment information.

In operation S225, the first processor 120a may request the second processor 120b to predict the dangerous situation based on the obtained state data of the vehicle. For example, the first processor 120a may transmit, to the second processor 120b, an image of the driver, who is manipulating the smart phone, as a form of the state data.

In operation S227, the second processor 120b may predict the dangerous situation of the vehicle by using the data recognition model.

In operation S229, the first processor 120a may request the third processor 120c to predict the dangerous situation based on the obtained state data of the other vehicle. For example, the first processor 120a may transmit, to the third processor 120c, information about a situation, in which the traffic light in front of the vehicle has turned red, as a form of the state data.

In operation S231, the third processor 120c may predict the dangerous situation of the vehicle by using the data recognition model.

In operation S233, the second processor 120b may transmit the predicted dangerous situation of the vehicle to the third processor 120c.

In operation S235, the third processor 120c may predict overall dangerous situations of the vehicle by using the data recognition model. For example, the third processor 120c may predict overall dangerous situations of the vehicle based on the dangerous situation, which is predicted by the second processor 120b based on the image of the driver who is manipulating the smart phone, and the dangerous situation, which is predicted by the third processor 120c based on the information about the situation in which the traffic light in front of the vehicle has turned red.

In operation S237, the third processor 120c may transmit the predicted dangerous situation to the first processor 120a.

Figure 2D:
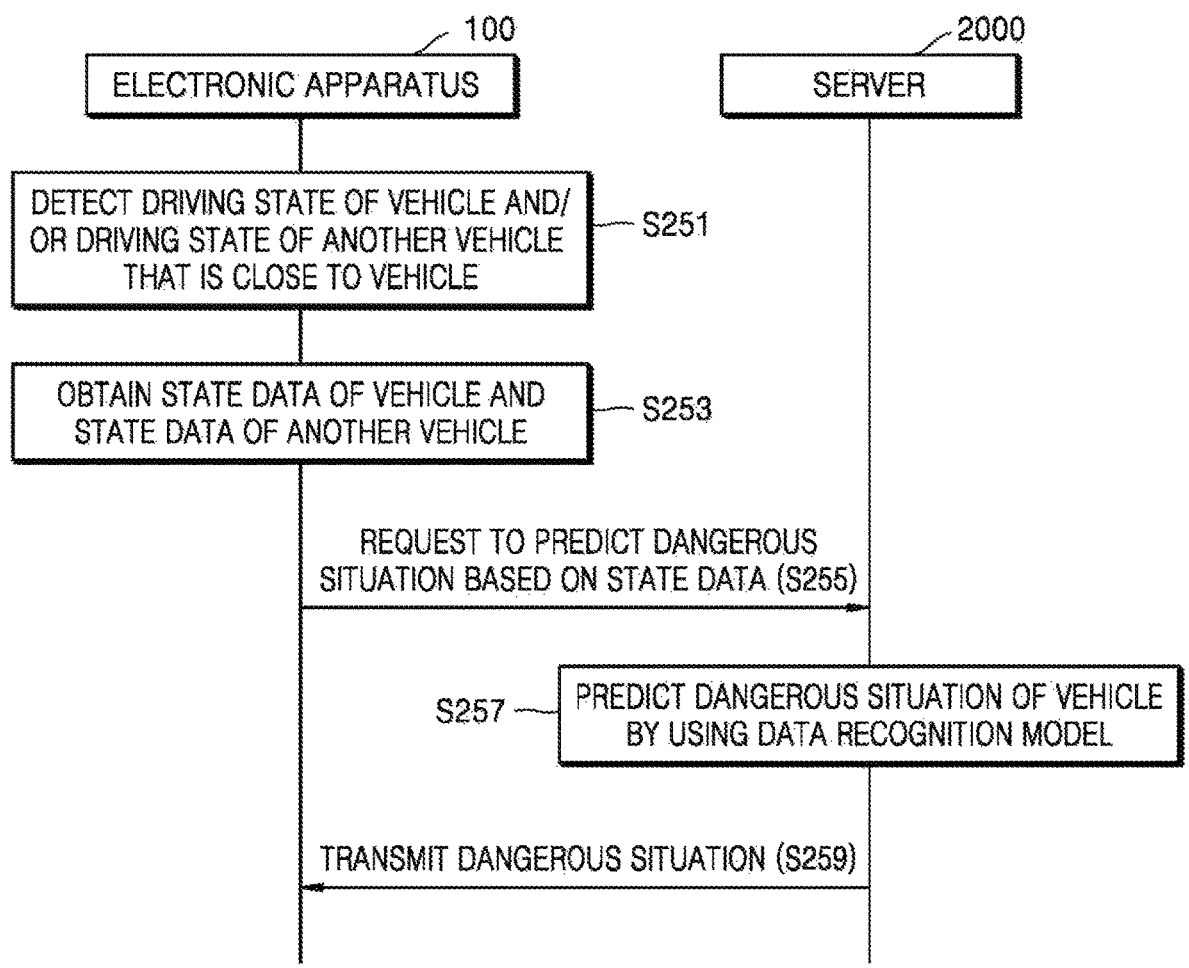
FIG. 2D is a flowchart for explaining a situation in which an electronic apparatus and a server predict a dangerous situation of a vehicle, according to an embodiment of the present disclosure.

FIG. 2D is a flowchart for explaining a situation in which the electronic apparatus 100 and a server 2000 predict a dangerous situation of a vehicle, according to various embodiment of the present disclosure.

Referring to FIG. 2D, the electronic apparatus 100 may predict the dangerous situation of the vehicle by using the server 2000.

According to an embodiment, the server 2000 may be a computing device that provides a service to client electronic apparatuses and may be, for example, a personal computer (PC), a laptop, a mobile phone, a micro server, a global positioning system (GPS) device, an e-book reader, home appliances, an electronic apparatus in a vehicle, and another mobile or non-mobile computing apparatus. However, the server 2000 is not limited thereto and may include all types of devices including a communication function and a data processing function.

Also, the electronic apparatus 100 may be communication-connected to the server 2000 via a network. In this case, the network may include a local area network (LAN), a wide area network (WAN), a value-added network (VAN), a mobile radio communication network, a satellite communication network, and a combination thereof, and the network may be, in a broad sense, a data communication network allowing the electronic apparatus 100 and the server 2000 to smoothly communicate with each other. Such a network may include wired Internet, wireless Internet, and a mobile wireless communication network.

In this case, an interface for receiving/transmitting data from/to the electronic apparatus 100 and the server 2000 may be defined.

For example, an application program interface (API) having training data, which is to be applied to the data recognition model, as a factor value (or a parameter value or transfer value) may be defined. The API may be defined as a set of sub-routines or functions that may be invoked by a protocol (e.g., a protocol from among protocols defined in the electronic apparatus 100) for certain processing of another protocol (e.g., a protocol from among protocols defined in the server 2000). That is, due to the API, there may be provided an environment in which an operation of another protocol is performed in any one of the protocols defined in the electronic apparatus 100.

In operation S251, the electronic apparatus 100 may detect the driving state of the vehicle and/or the driving state of the other vehicle in the vicinity of the vehicle. Also, the electronic apparatus 100 may detect the state of the driver, the vehicle information of the other vehicle, and the surrounding environment information.

According to an embodiment, the electronic apparatus 100 may detect the driving state of the vehicle, the state of the driver, the driving state of the other vehicle, the vehicle information of the other vehicle, and the surrounding environment information by using the acceleration sensor 231, the gyroscope sensor 234, the IMU 225, the RADAR sensor 226, the LIDAR sensor 227, the image sensor 228, and the like.

In operation S253, the electronic apparatus 100 may obtain the state data of the vehicle and/or the state data of the other vehicle. Also, the electronic apparatus 100 may obtain the state data regarding the state of the driver, the vehicle information of the other vehicle, and/or the surrounding environment information.

In operation S255, the electronic apparatus 100 may request the server 2000 to predict the dangerous situation based on the obtained state data.

In operation S257, the server 2000 may predict the dangerous situation of the vehicle by using the data recognition model.

For example, the electronic apparatus 100 may transmit, to the server 2000, the state data indicating that the driver is manipulating the smart phone, and the state data indicating the traffic light in front of the vehicle has turned red. The server 2000 may use the data recognition model to predict a collision risk based on the state data regarding the driver and the traffic light.

In operation S259, the server 2000 may transmit the predicted dangerous situation to the electronic apparatus 100.

FIGS. 1, 2A, 2B, 2C, and 2D are provided to describe an embodiment of the present disclosure, and one or more embodiments of the present disclosure are not limited thereto.

Hereinafter, examples of states included in state data will be described in detail with reference to FIGS. 3, 4, 5, and 6.

Figure 4:
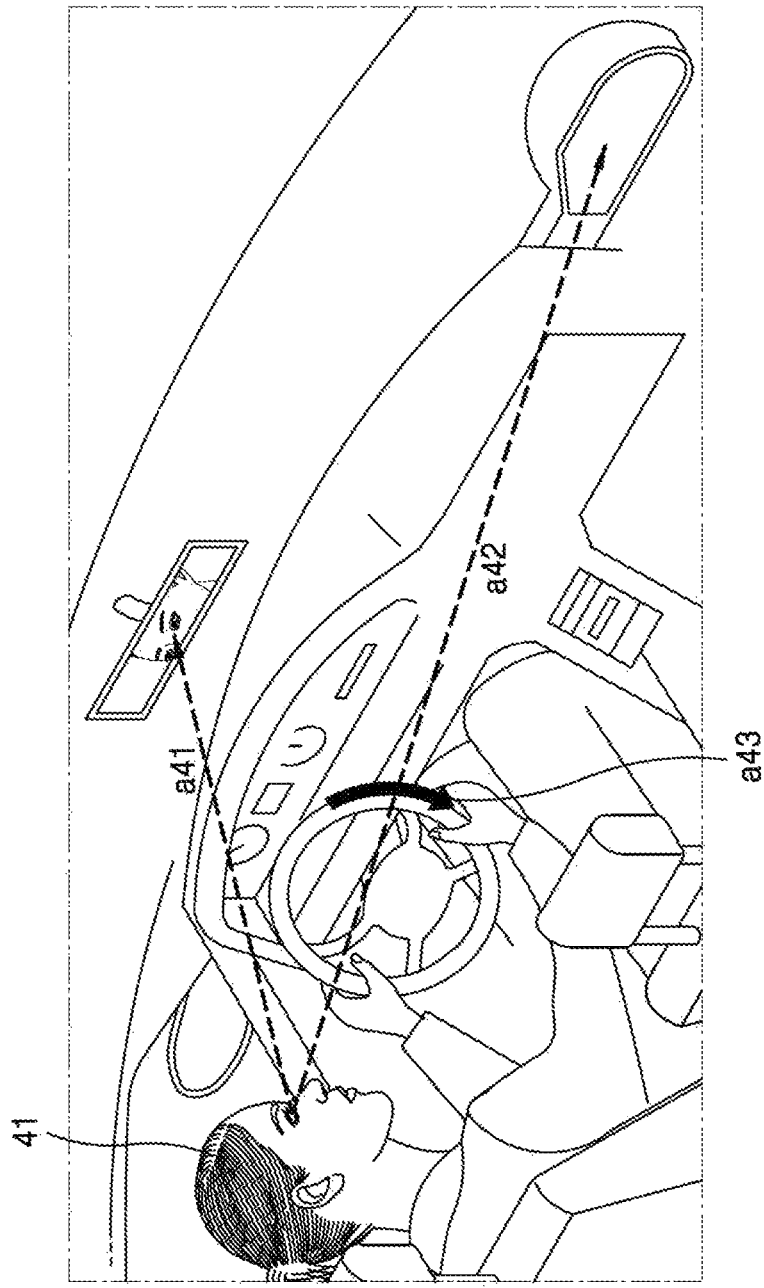

FIGS. 3 and 4 illustrate states of drivers who are driving, according to various embodiments of the present disclosure.

According to an embodiment, the state data may include the states of the drivers.

According to an embodiment, the sensor 110 including the image sensor 228 may obtain images of the drivers who are driving the vehicle 1 and thus may detect the states of the drivers which include at least one of facial expressions, eye directions, and actions of the drivers.

Referring to FIG. 3, for example, the sensor 110 of the electronic apparatus 100 may detect that a driver 21 yawns a certain number of times within a certain period of time while driving. Also, for example, the sensor 110 may detect that a driver 22 does not keep his/her eyes directed forward for at least several seconds while driving. In addition, for example, the sensor 110 may detect that a driver 23 is manipulating a smart phone while driving.

Referring to FIG. 4, for example, the sensor 110 of the electronic apparatus 100 may detect an eye direction a41 of a driver 41 towards a rearview mirror or an eye direction a42 towards a right side-view mirror. Also, for example, the sensor 110 may detect an action a43 that the driver 41 moves a steering wheel in a clockwise direction.

According to an embodiment, the processor 120 of the electronic apparatus 100 may detect a driving intention of the driver 41 based on the detected eye directions a41 and a42 and action a43. For example, the processor 120 of the electronic apparatus 100 may determine a driving intention that a driver desires to move to a lane on the right.

Figure 5:
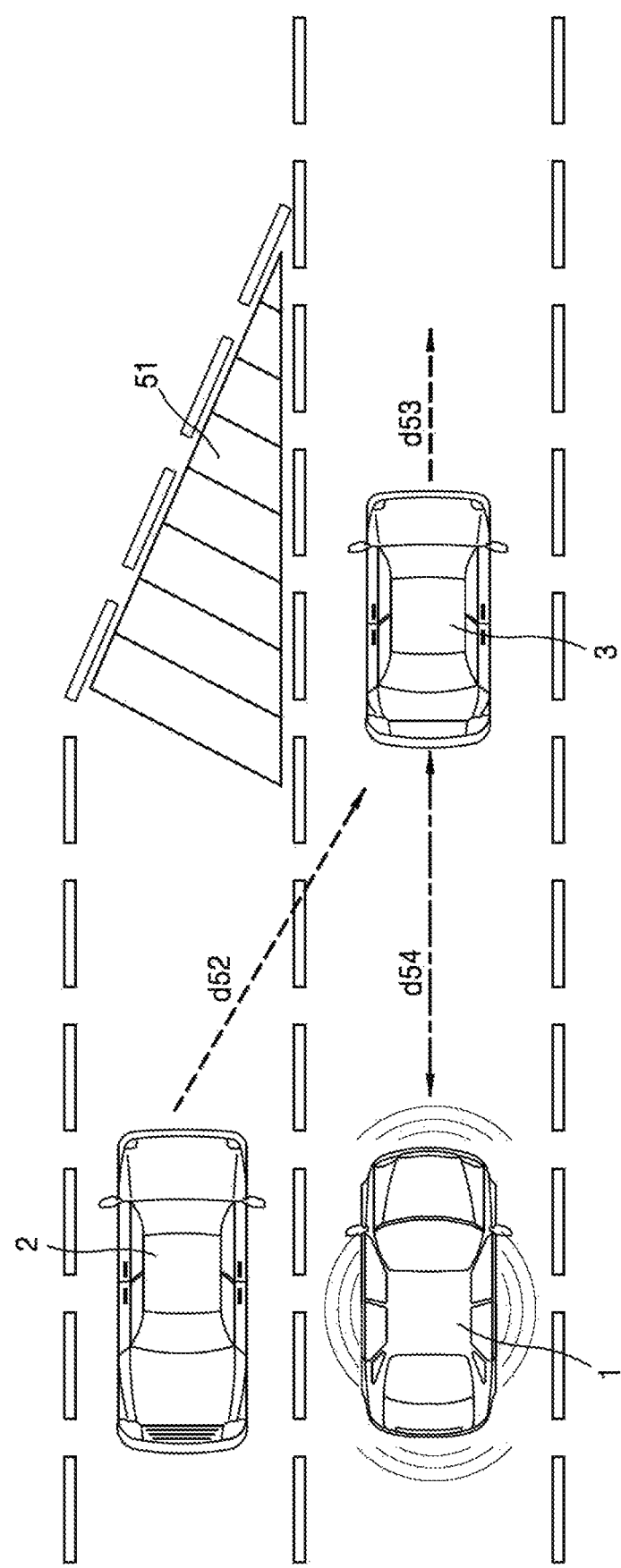
FIG. 5 is a diagram for explaining a driving state of a vehicle and a driving state of other vehicles in a vicinity of the vehicle, according to an embodiment of the present disclosure.

FIG. 5 is a diagram for explaining a driving state of the vehicle 1 and a driving state of other vehicles 2 and 3 in the vicinity of the vehicle 1, according to an embodiment of the present disclosure.

According to an embodiment, the state data may include the driving states of the vehicle 1 and the other vehicles 2 and 3. According to an embodiment, the driving state may include driving patterns such as a driving speed, driving acceleration, a driving direction, hard braking, and sudden acceleration.

Referring to FIG. 5, the sensor 110 of the electronic apparatus 100 may detect a driving state d54 of the vehicle 1 that includes a driving speed, driving acceleration, a time interval between the vehicle 1 and a vehicle 3 in front of the vehicle 1, a distance therebetween, and the like. For example, the sensor 110 may determine that the vehicle 1 is being driven forwards at a speed of 80 km/h and a time interval of 10 seconds between it and a vehicle ahead.

Also, the sensor 110 may detect a driving state d52 of the vehicle 2 driving in a lane next to the vehicle 1. For example, the sensor 110 may detect that the vehicle 2 is being driven at a speed of 70 km/h in the lane next to the vehicle 1 and a driver of the vehicle 2 desires to change a driving direction to move to the front of the vehicle 1.

Also, the sensor 110 may detect a driving state d53 of the vehicle 3 driving in front of the vehicle 1. For example, the sensor 110 may detect that the vehicle 3 is being driven at a speed of 70 km/h in front of the vehicle 1.

In addition, according to an embodiment, the state data may include a surrounding environment state.

According to an embodiment, the sensor 110 of the electronic apparatus 100 may detect a surrounding environment of the vehicle 1. According to an embodiment, the sensor 110 may detect types of lanes on which the vehicles 1 to 3 are driving. For example, the sensor 110 may detect that the road, on which the vehicle 1 is being driven, includes a section 51 where two lanes narrow down to one lane several hundred meters ahead.

In addition, the sensor 110 of the electronic apparatus 100 may determine whether there is poor visibility due to fog, rain, snow, etc., whether the road is frozen, whether there is an accident-prone area or road-work area, and the like.

Furthermore, the sensor 110 may detect pedestrians, obstacles, or the like on a driving path.

FIG. 6 is a diagram for explaining vehicle information of other vehicles 61 to 63 in the vicinity of a vehicle, according to an embodiment of the present disclosure.

According to an embodiment, the state data may include the vehicle information.

The vehicle information according to an embodiment may include a model, a year, a weight, an insurance history, a potential accident rate, and the like of a vehicle.

According to an embodiment, the sensor 110 of the electronic apparatus 100 may obtain images of the other vehicles 61 to 63 driving in the vicinity of the vehicle 1. The processor 120 may obtain the vehicle information of the other vehicles 61 to 63 from the obtained images.

Referring to FIG. 6, the electronic apparatus 100 may recognize other vehicles 61 to 63 driving in front of the vehicle 1. The electronic apparatus 100 may extract a model, a year, etc. of the vehicles 61 to 63 from the images thereof.

Also, the electronic apparatus 100 may transmit the images of the vehicles 61 to 63 to a server and may receive, from the server, vehicle information including the model, the year, etc. of the vehicles 61 to 63.

In addition, according to an embodiment, the electronic apparatus 100 may transmit plate numbers, which are extracted from the images, to a server of an insurance company and may obtain, from the server of the insurance company, accident histories respectively corresponding to the plate numbers.

Moreover, according to an embodiment, the electronic apparatus 100 may determine potential accident rates of the vehicles 61 to 63 based on information about the model, the year, etc. of the vehicles 61 to 63 which are extracted from the images.

As another example, the electronic apparatus 100 may transmit the images to the server and may receive therefrom information about the potential accident rates of the vehicles 61 to 63 determined based on the information about the model, the year, etc.

Figure 7:
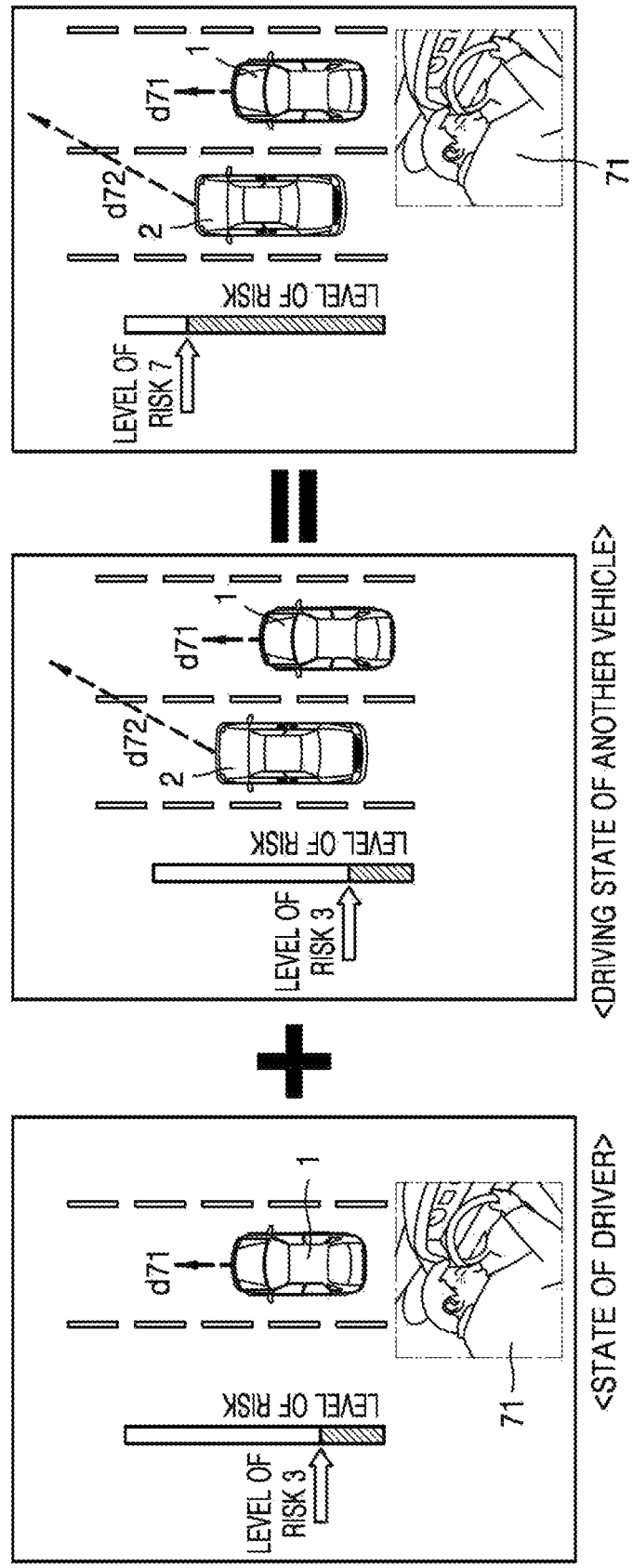
FIG. 7 is a diagram for explaining a method of obtaining state data, according to an embodiment of the present disclosure.

FIG. 7 is a diagram for explaining a method of obtaining state data, according to an embodiment of the present disclosure.

Referring to FIG. 7, the processor 120 of the electronic apparatus 100 may determine a dangerous situation based on state data obtained by combining a state of a driver 71 who drives the vehicle 1 with a driving state of the vehicle 2.

According to an embodiment, when the electronic apparatus 100 only detects that the driver 71 is dozing off, the processor 120 may determine that a level of risk of a predicted dangerous situation is low (e.g., the level of risk is 3).

Also, when the sensor 110 of the electronic apparatus 100 only detects that the driver of the vehicle 2 desires to move to (e.g., in the driving intension/direction d72) the front of the vehicle 1 (e.g., moving in the driving pattern d71), the processor 120 may determine that a level of risk of a predicted dangerous situation is low (e.g., the level of risk is 3).

According to an embodiment, when a point in time when the driver 71 is dozing off is close to a point in time when the vehicle 2 changes a lane, the processor 120 may determine that a level of risk of a predicted dangerous situation is high (e.g., the level of risk is 7). For example, the processor 120 may predict a risk of collision between the vehicle 1 and the vehicle 2 and may determine the level of risk is high due to the lane change of the vehicle 2.

According to an embodiment, when the electronic apparatus 100 detects that the driver 71 is dozing off, the vehicle 2 changes lanes, and the vehicle 1 accelerates, the processor 120 may determine that a level of risk of a predicted dangerous situation is higher (e.g., the level of risk is 10) than the levels of risk of the above predicted dangerous situations.

According to an embodiment, the processor 120 of the electronic apparatus 100 may determine the dangerous situation based on the state data obtained by combining various states detected at close points of time. Also, the processor 120 may update the data recognition model by training the dangerous situations determined based on the state data.

FIGS. 3, 4, 5, 6, and 7 are provided to describe embodiments of the present disclosure, but one or more embodiments of the present disclosure are not limited thereto.

Figure 8A:
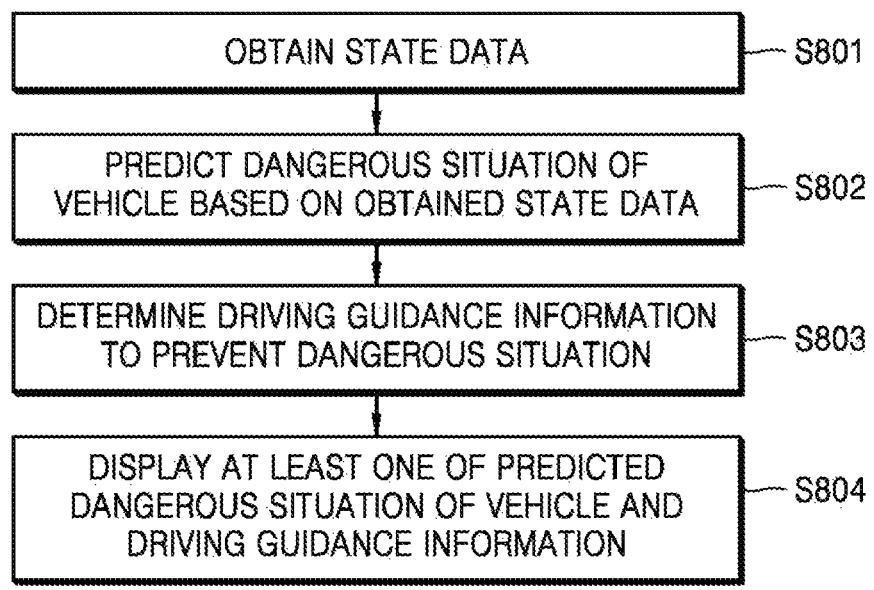
FIG. 8A is a flowchart of a method of determining driving guidance information, according to an embodiment of the present disclosure.

FIG. 8A is a flowchart of a method of determining driving guidance information, according to an embodiment of the present disclosure.

In operation S801, the processor 120 of the electronic apparatus 100 may obtain the state data. Operation S202 of FIG. 2A may be referred to for operation S801. Since the state data according to an embodiment has been described with reference to FIGS. 3 to 7, a detailed description of the state data will be omitted herein.

In operation S802, the processor 120 of the electronic apparatus 100 may determine a dangerous situation of the vehicle based on the obtained state data. Operation S203 of FIG. 2A may be referred to for operation S802.

In operation S803, the processor 120 of the electronic apparatus 100 may determine the driving guidance information for preventing the dangerous situation.

For example, when a collision with a vehicle ahead is predicted, the processor 120 of the electronic apparatus 100 may determine the driving guidance information such as hard braking or a direction change of the vehicle in order to prevent the collision.

According to an embodiment, the processor 120 may use at least one data recognition model to determine the driving guidance information based on the dangerous situation. Also, the processor 120 may update the data recognition model by training the driving guidance information determined to prevent the dangerous situation.

In operation S804, the processor 120 of the electronic apparatus 100 may display at least one of the determined dangerous situation of the vehicle and the driving guidance information.

According to an embodiment, the processor 120 may display at least one of the dangerous situation and the driving guidance information on a display of an apparatus connected through a head-up display, a central information display (CID), a mirror display, and a communicator of the vehicle 1. However, one or more embodiments are not limited thereto.

For example, the processor 120 may display, on the head-up display, a notification message of warning a risk of a collision with a vehicle ahead.

Also, according to an embodiment, the processor 120 may output at least one of the dangerous situation and the driving guidance information as sound by using a sound output unit 282. For example, the processor 120 may output, as sound, a message saying stop driving.

Figure 8B:
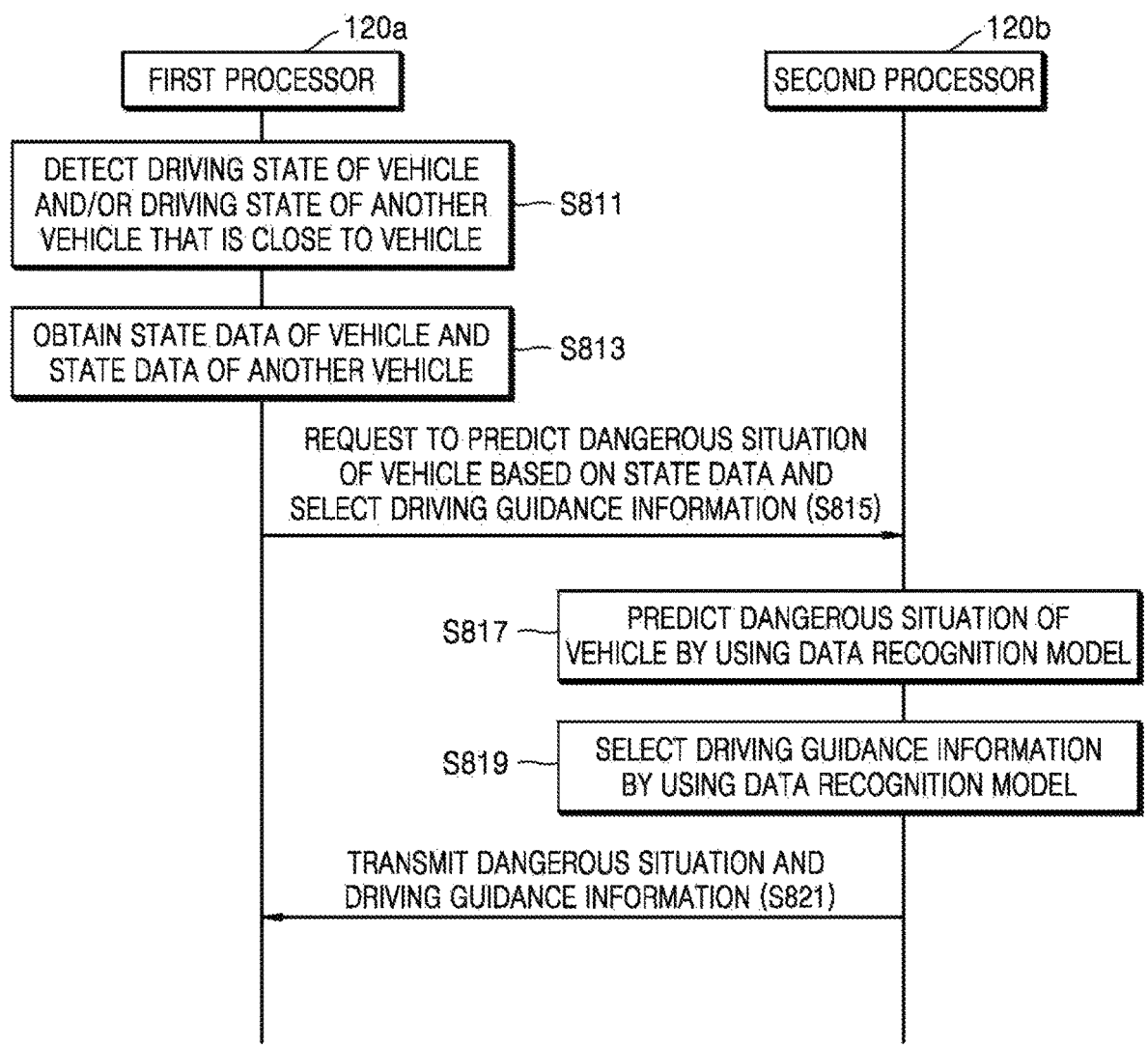
FIG. 8B is a flowchart for explaining a situation in which a first processor and a second processor predict a dangerous situation of a vehicle and select driving guidance information, according to an embodiment of the present disclosure.

FIG. 8B is a flowchart for explaining a situation in which the first processor 120a and the second processor 120b predict a dangerous situation of a vehicle and select driving guidance information, according to an embodiment of the present disclosure.

Referring to FIG. 8B, the electronic apparatus 100 may include the first processor 120a and the second processor 120b.

In operation S811, the first processor 120a may detect the driving state of the vehicle and/or the driving state of another vehicle in the vicinity of the vehicle. Also, the first processor 120a may detect the state of the driver, the vehicle information of the other vehicle, and the surrounding environment information.

In operation S813, the first processor 120a may obtain the state data of the vehicle and/or the state data of the other vehicle. Also, the first processor 120a may obtain the state data regarding the state of the driver, the vehicle information of the other vehicle, and/or the surrounding environment information.

In operation S815, the first processor 120a may request the second processor 120b to predict the dangerous situation based on the obtained state data, and to select the driving guidance information.

In operation S817, the second processor 120b may predict the dangerous situation of the vehicle by using the data recognition model.

In operation S819, the second processor 120b may select driving guidance information appropriate for the dangerous situation of the vehicle which is predicted by using the data recognition model.

For example, the first processor 120a may transmit, to the second processor 120b, the state data indicating that the driver is manipulating the smart phone and the state data indicating that the traffic light ahead of the vehicle has turned red.

The second processor 120b may use the data recognition model to predict that there is a collision risk based on the state data regarding the driver and the traffic light. The second processor 120b may apply the predicted dangerous situation to the data recognition model and may select a notification that warns a risk of a collision with the vehicle ahead.

In operation S821, the second processor 120b may transmit the predicted dangerous situation and the selected driving guidance information to the first processor 120a. The first processor 120a may display at least one of the dangerous situation and the driving guidance information on the display of the apparatus connected through the head-up display, the CID, the mirror display, and the communicator of the vehicle. For example, the first processor 120a may output, as sound, a message saying stop driving.

Figure 8C:
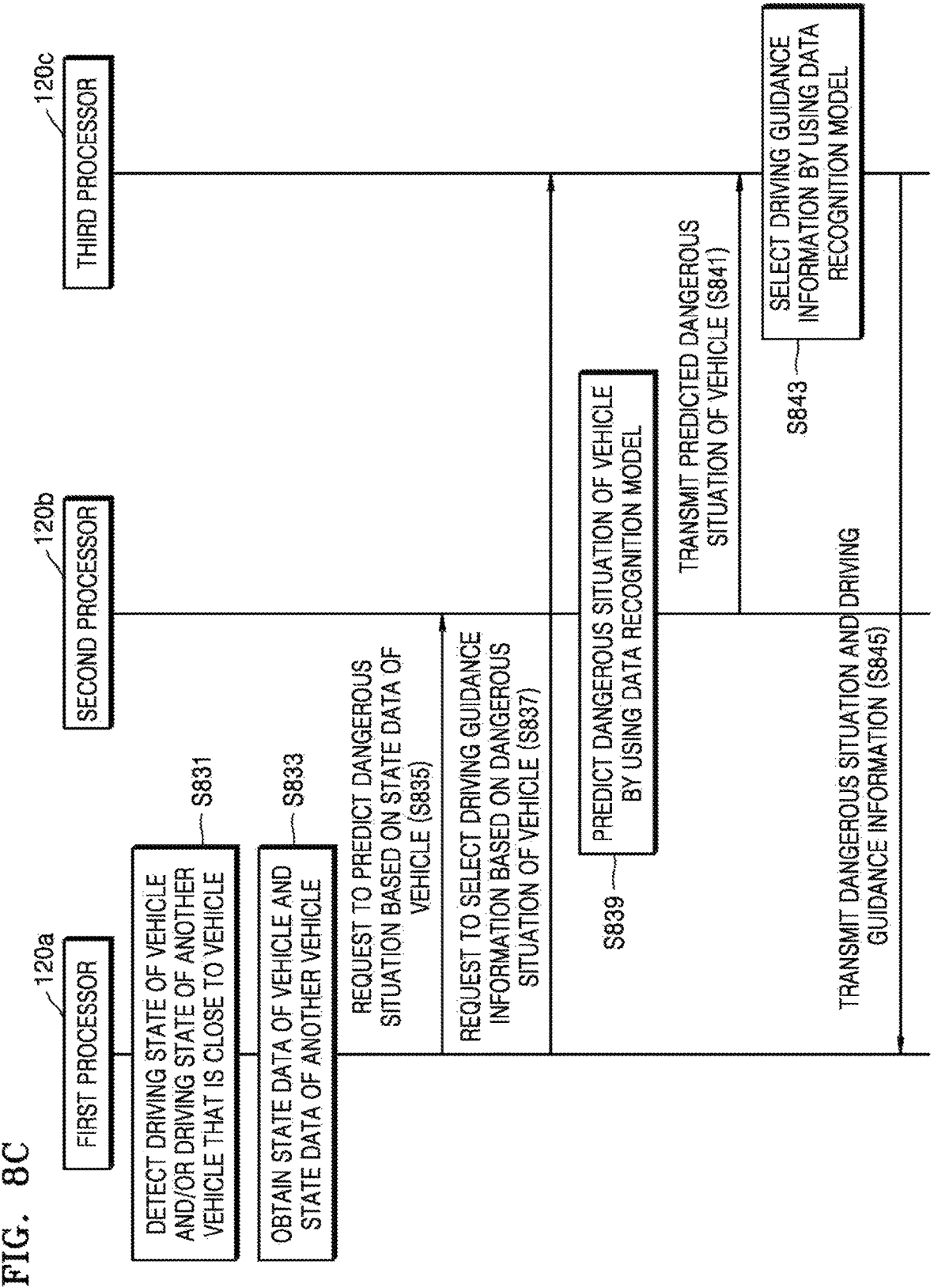
FIG. 8C is a flowchart for explaining a situation in which a first processor, a second processor, and a third processor predict a dangerous situation of a vehicle and select driving guidance information, according to an embodiment of the present disclosure.

FIG. 8C is a flowchart for explaining a situation in which the first processor 120a, the second processor 120b, and the third processor 120c predict the dangerous situation of the vehicle and select the driving guidance information, according to an embodiment of the present disclosure.

According to an embodiment, the electronic apparatus 100 may include the first processor 120a, the second processor 120b, and the third processor 120c. The third processor 120c may select the driving guidance information based on the dangerous situation of the vehicle by using the data recognition model.

In operation S831, the first processor 120a may detect the driving state of the vehicle and/or the driving state of the other vehicle in the vicinity of the vehicle. Also, the first processor 120a may detect the state of the driver, the vehicle information of the other vehicle, and the surrounding environment information.

In operation S833, the first processor 120a may obtain the state data of the vehicle and/or the state data of the other vehicle. Also, the first processor 120a may obtain the state data regarding the state of the driver, the vehicle information of the other vehicle, and/or the surrounding environment information.

In operation S835, the first processor 120a may request the second processor 120b to predict the dangerous situation based on the obtained state data.

In operation S837, the first processor 120a may request the third processor 120c to select the driving guidance information based on the dangerous situation of the vehicle.

For example, the first processor 120a may transmit, to the third processor 120c, the state data indicating that the driver is manipulating the smart phone and the state data indicating that the traffic light ahead of the vehicle has turned red.

In operation S839, the second processor 120b may predict the dangerous situation of the vehicle by using the data recognition model.

For example, the second processor 120b may apply the state data regarding the driver and the traffic light to the data recognition model and thus may predict that there is a collision risk.

In operation S841, the second processor 120b may transmit the predicted dangerous situation to the third processor 120c.

In operation S843, the third processor 120c may apply the predicted dangerous situation to the data recognition model and thus may select the driving guidance information.

For example, the third processor 120c may apply the predicted dangerous situation to the data recognition model and thus select a notification that warns a risk of a collision with the vehicle ahead.

In operation S845, the third processor 120c may transmit the predicted dangerous situation and the selected driving guidance information to the first processor 120a. The first processor 120a may display at least one of the dangerous situation and the driving guidance information on the display of the apparatus connected through the head-up display, the CID, the mirror display, and the communicator of the vehicle. Also, according to various embodiments, the first processor 120a may output, as sound, a message saying stop driving.

Figure 8D:
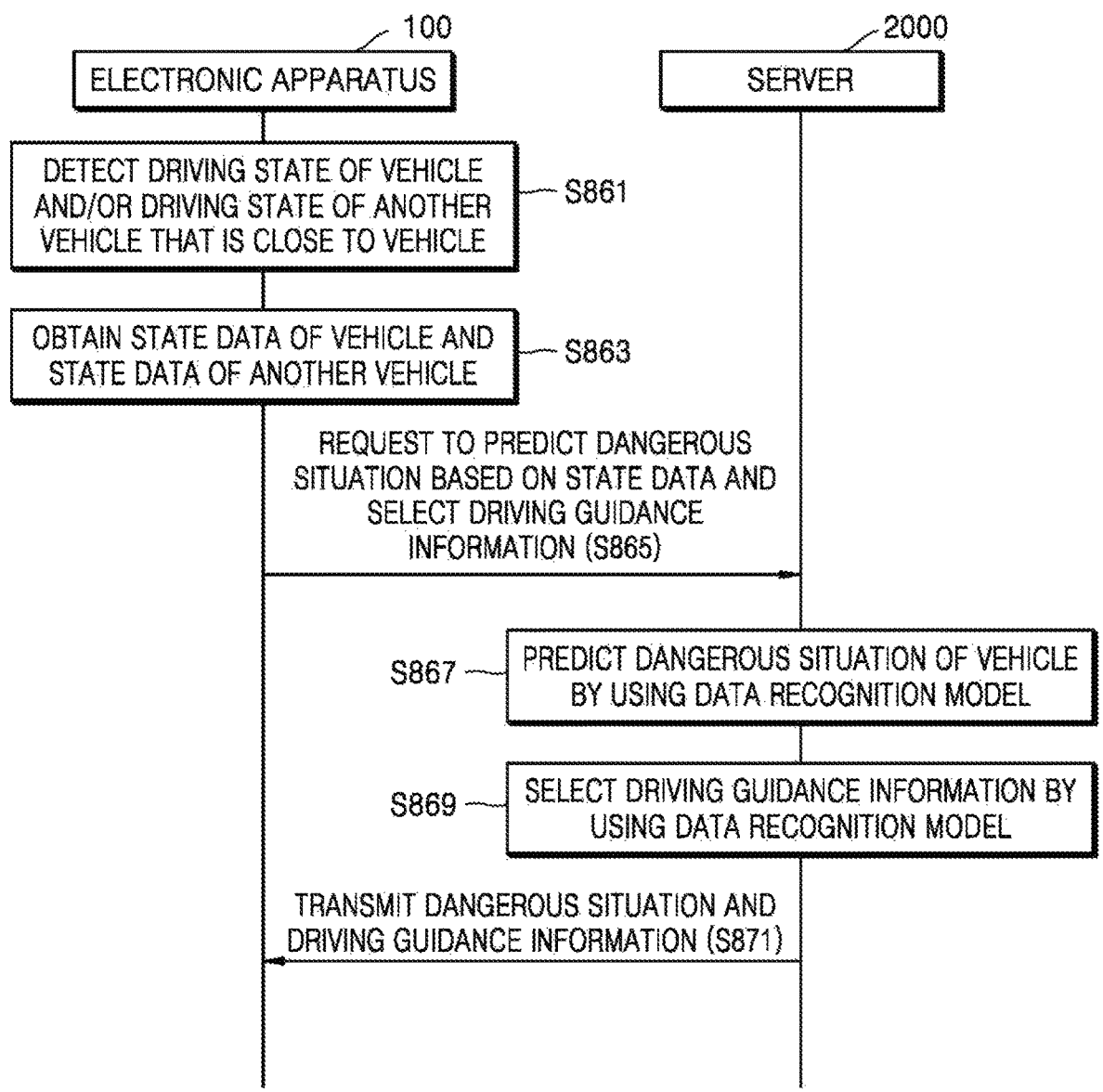
FIG. 8D is a flowchart for explaining a situation in which an electronic apparatus and a server predict a dangerous situation of a vehicle and select driving guidance information, according to an embodiment of the present disclosure.

FIG. 8D is a flowchart for explaining a situation in which the electronic apparatus 100 and the server 2000 predict a dangerous situation of a vehicle and select the driving guidance information, according to an embodiment of the present disclosure.

Referring to FIG. 8D, the electronic apparatus 100 may predict the dangerous situation of the vehicle and select the driving guidance information by using the server 2000.

In operation S861, the electronic apparatus 100 may detect the driving state of the vehicle and/or the driving state of another vehicle in the vicinity of the vehicle. Also, the electronic apparatus 100 may detect the state of the driver, the vehicle information of the other vehicle, and the surrounding environment information.

In operation S863, the electronic apparatus 100 may obtain the state data of the vehicle and/or the state data of the other vehicle. Also, the electronic apparatus 100 may obtain the state data regarding the state of the driver, the vehicle information of the other vehicle, and/or the surrounding environment information.

In operation S865, the electronic apparatus 100 may request the sever 2000 to predict the dangerous situation based on the obtained state data and to select the driving guidance information.

In operation S867, the sever 2000 may predict the dangerous situation of the vehicle by using the data recognition model.

For example, the electronic apparatus 100 may transmit, to the sever 2000, the state data indicating that the driver is manipulating the smart phone and the state data indicating that the traffic light ahead of the vehicle has turned red.

In operation S869, the sever 2000 may select driving guidance information appropriate for the dangerous situation of the vehicle which is predicted by using the data recognition model.

For example, the server 2000 may use the data recognition model to predict that there is a collision risk based on the state data regarding the driver and the traffic light. The server 2000 may apply the predicted dangerous situation to the data recognition model and thus may select a notification of warning a risk of a collision with the vehicle ahead.

In operation S871, the server 2000 may transmit the predicted dangerous situation and the selected driving guidance information to the electronic apparatus 100. The electronic apparatus 100 may display at least one of the dangerous situation and the driving guidance information on the display of the apparatus connected through the head-up display, the CID, the mirror display, and the communicator of the vehicle. Also, according to various embodiments, the electronic apparatus 100 may output, as sound, a message saying stop driving.

Figure 9:
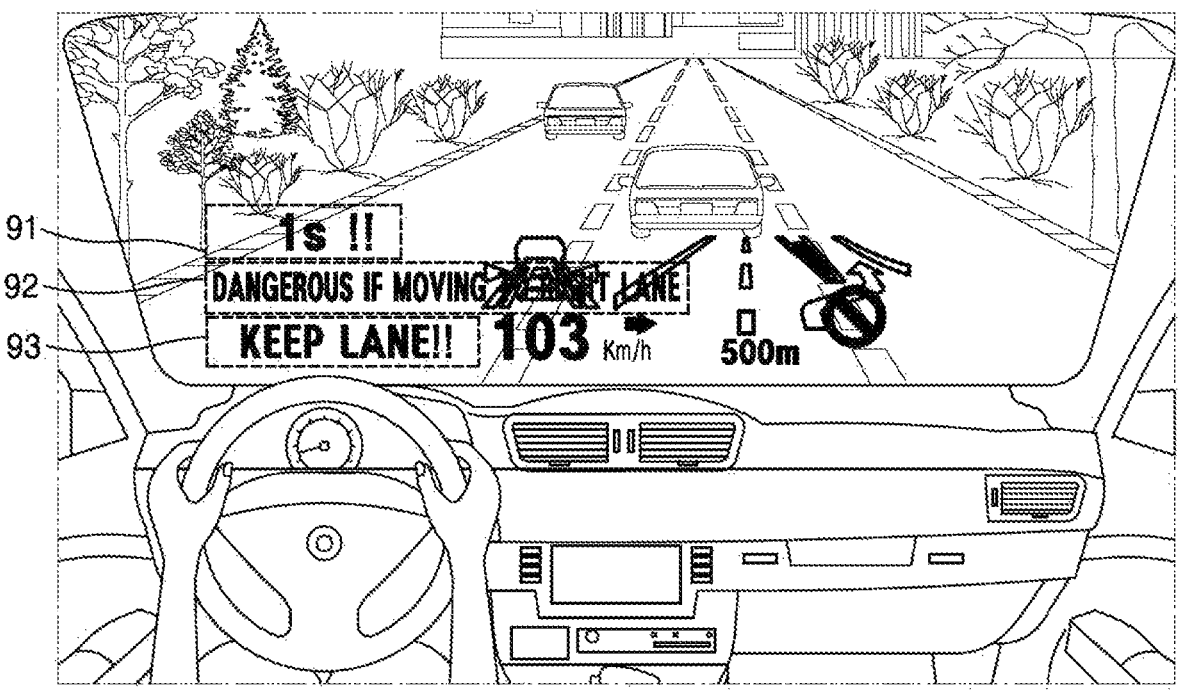
FIG. 9 illustrates an example of providing a user with driving guidance information, according to an embodiment of the present disclosure.

FIG. 9 illustrates an example of providing a user with the driving guidance information, according to an embodiment of the present disclosure.

Referring to FIG. 9, for example, when the driver desires to move the vehicle 1 to a second lane while driving in a first lane, the driver may not be aware of a vehicle trying to move from a third lane to the second lane, but the electronic apparatus 100 may determine a dangerous situation, which may occur during a lane change, in advance and may notify the driver about the dangerous situation.

According to an embodiment, the electronic apparatus 100 may determine a driving intention that the driver tries to move to the second lane. For example, the electronic apparatus 100 may detect that the driver looks at a right side-view mirror and moves a steering wheel in a clockwise direction. The electronic apparatus 100 may detect a driving intention to change a lane, a driving speed of the vehicle 1, a driving speed of the vehicle trying to move from the third lane to the second lane, a temporal interval between the vehicles, and the like. When the electronic apparatus 100 changes a driving lane to the second lane based on the detected states, the electronic apparatus 100 may predict that the vehicle 1 may collide with the vehicle trying to move from the third lane to the second lane.

Referring to FIG. 9, for example, the processor 120 may display, on the head-up display, a dangerous situation 92 (e.g., "dangerous if moving to the right lane!") of the vehicle 1. Also, the processor 120 may display a temporal interval 91 (e.g., "1 second") with another vehicle. In addition, the processor 120 may display the driving guidance information 93 (e.g., "keep the lane!") to prevent the dangerous situation.

According to an embodiment, the electronic apparatus 100 may recognize in advance a dangerous situation that the driver does not predict and may notify the driver of the driving guidance information, thereby providing a safe driving environment.

FIGS. 8A and 9 are provided to describe an embodiment, but one or more embodiments of the present disclosure are not limited thereto.

Figure 10:
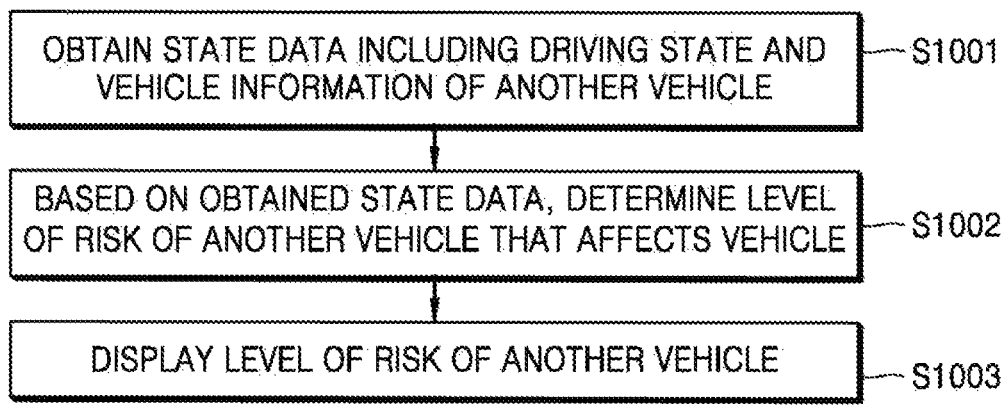
FIG. 10 is a flowchart of a method of determining a level of risk of another vehicle, according to an embodiment of the present disclosure.
Figure 11:
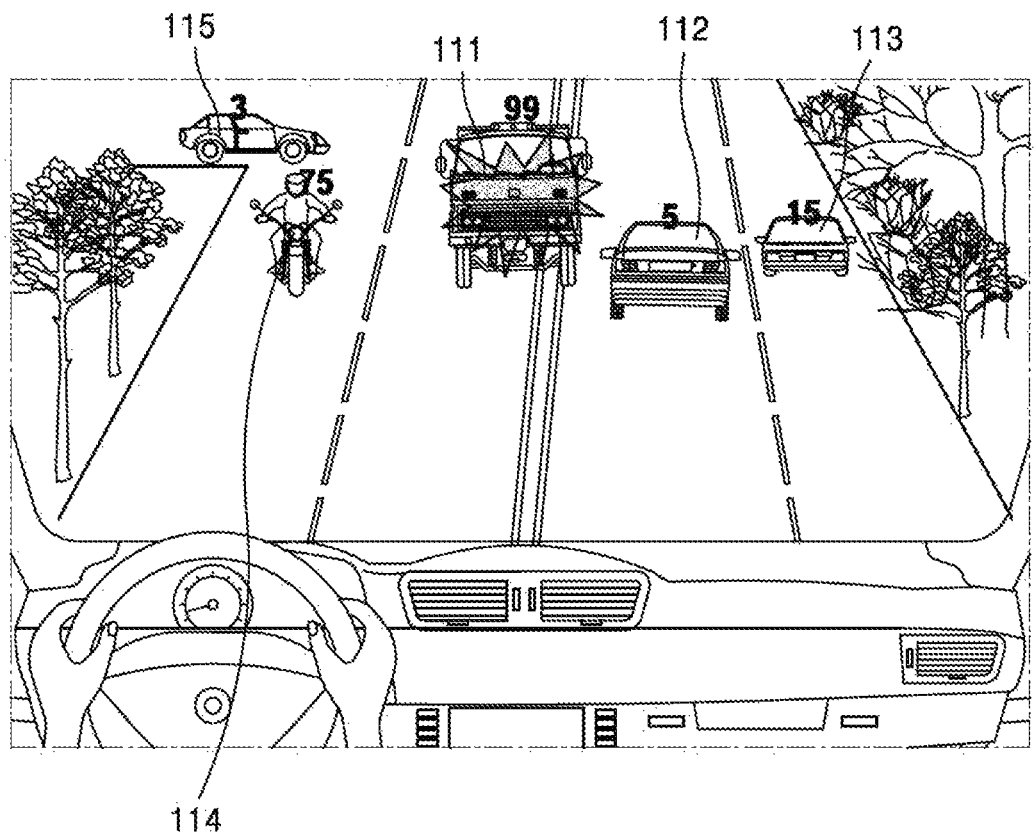
FIGS. 11 and 12 illustrate examples of providing a user with levels of risk of other vehicles, according to an embodiment of the present disclosure.
Figure 12:
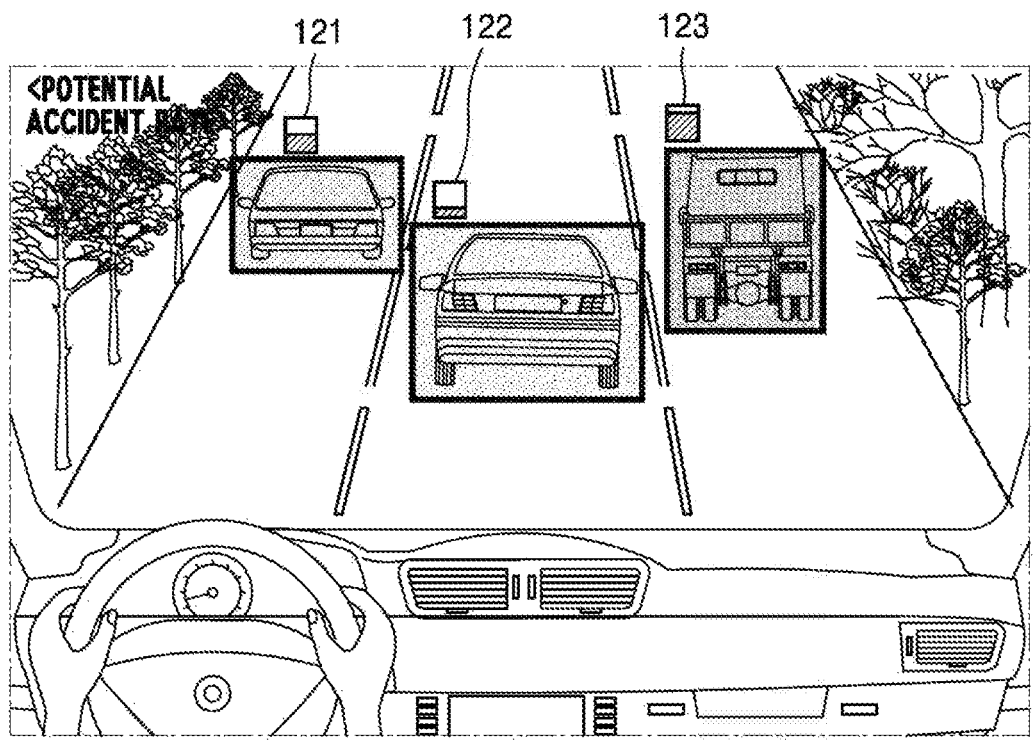

FIG. 10 is a flowchart of a method of determining a level of risk of another vehicle, according to an embodiment of the present disclosure. FIGS. 11 and 12 illustrate examples of providing a user with a level of risk of another vehicle, according to an embodiment of the present disclosure. The flowchart of FIG. 10 will be described with reference to FIGS. 11 and 12.

In operation S1001 of FIG. 10, the processor 120 of the electronic apparatus 100 may obtain the state data including the driving state and the vehicle information of the other vehicle. The example of obtaining the driving state and the vehicle information of the other vehicle has been described with reference to FIGS. 5 and 6, and thus a detailed description thereof will be omitted herein.

In operation S1002 of FIG. 10, the processor 120 of the electronic apparatus 100 may determine a level of risk of the other vehicle that may affect the vehicle, based on the obtained state data. In operation S1003, the processor 120 of the electronic apparatus 100 may display the level of risk of the other vehicle.

Referring to FIG. 11, for example, a truck 111 being driven in an opposite direction to the vehicle 1 may cross the center line while being driven. In this case, the processor 120 of the electronic apparatus 100 may determine a level of risk of the truck 111, which is crossing the center line, from among other vehicles 111 to 115 that are visible through a wind shield, and may display the level of risk on the head-up display.

For example, the processor 120 may display the level of risk as numbers and may display the numbers in different colors according to the level of risk. Also, the processor 120 may display icons notifying about the risks, etc., but the present disclosure is not limited thereto.

Referring to FIG. 12, according to an embodiment, the processor 120 may determine levels of risk of other vehicles 121 to 123 based on vehicle information of the other vehicles 121 to 123 driving. For example, the processor 120 may determine the levels of risk of the based on potential accident rates based on insurance accident histories, models, and years of the other vehicles 121 to 123.

As illustrated in FIG. 12, the processor 120 may display the levels of risk in bar graphs and may display the bar graphs in different colors according to the levels of risk. For example, the processor 120 may display a bar graph corresponding to a vehicle having a high level of risk in a red color and a bar graph corresponding to a vehicle having a low level of risk in a green color.

In addition, the processor 120 may display icons, etc. to distinguish the vehicle having the high level of risk. Also, the processor 120 may display heat maps to distinguish the levels of risk of the vehicles 121 to 123. However, one or more embodiments of the present disclosure are not limited thereto.

As another example, the processor 120 may output, as sound, the levels of risk of the other vehicles 121 to 123 through the sound output unit 282.

FIGS. 10, 11, and 12 illustrate an embodiment, but one or more embodiments of the present disclosure are not limited thereto.

Figure 13A:
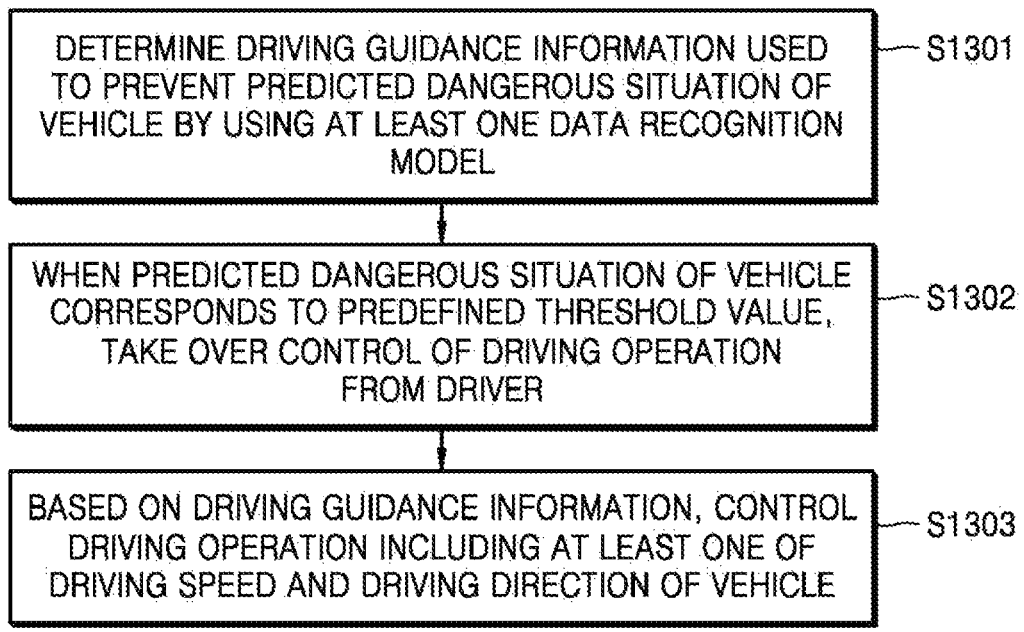
FIG. 13A is a flowchart of a method in which an electronic apparatus controls a driving operation of a vehicle, according to an embodiment of the present disclosure.

FIG. 13A is a flowchart of a method in which the electronic apparatus 100 controls a driving operation of a vehicle, according to an embodiment of the present disclosure.

In operation S1301, the processor 120 of the electronic apparatus 100 may use at least one data recognition model to determine the driving guidance information used to prevent the determined dangerous situation of the vehicle. Operation S803 of FIG. 8A may be referred to for operation S1301.

In operation S1302, when the level of risk of the determined dangerous situation of the vehicle corresponds to a preset threshold value, the processor 120 of the electronic apparatus 100 may take over control of the driving operation from the driver.

According to an embodiment, when a predicted level of risk is high, and when it is determined that a dangerous situation is difficult to be prevented based on the state of the driver, the processor 120 may block a signal for controlling the operation of the vehicle 1 by the driver.

In operation S1303, the processor 120 of the electronic apparatus 100 may control the driving operation including at least one of the driving speed and the driving direction of the vehicle, based on the driving guidance information. For example, the electronic apparatus 100 may suddenly stop the vehicle 1 by applying brakes so as to prevent a collision. Also, the electronic apparatus 100 may change a driving direction to prevent a collision risk.

Figure 13B:
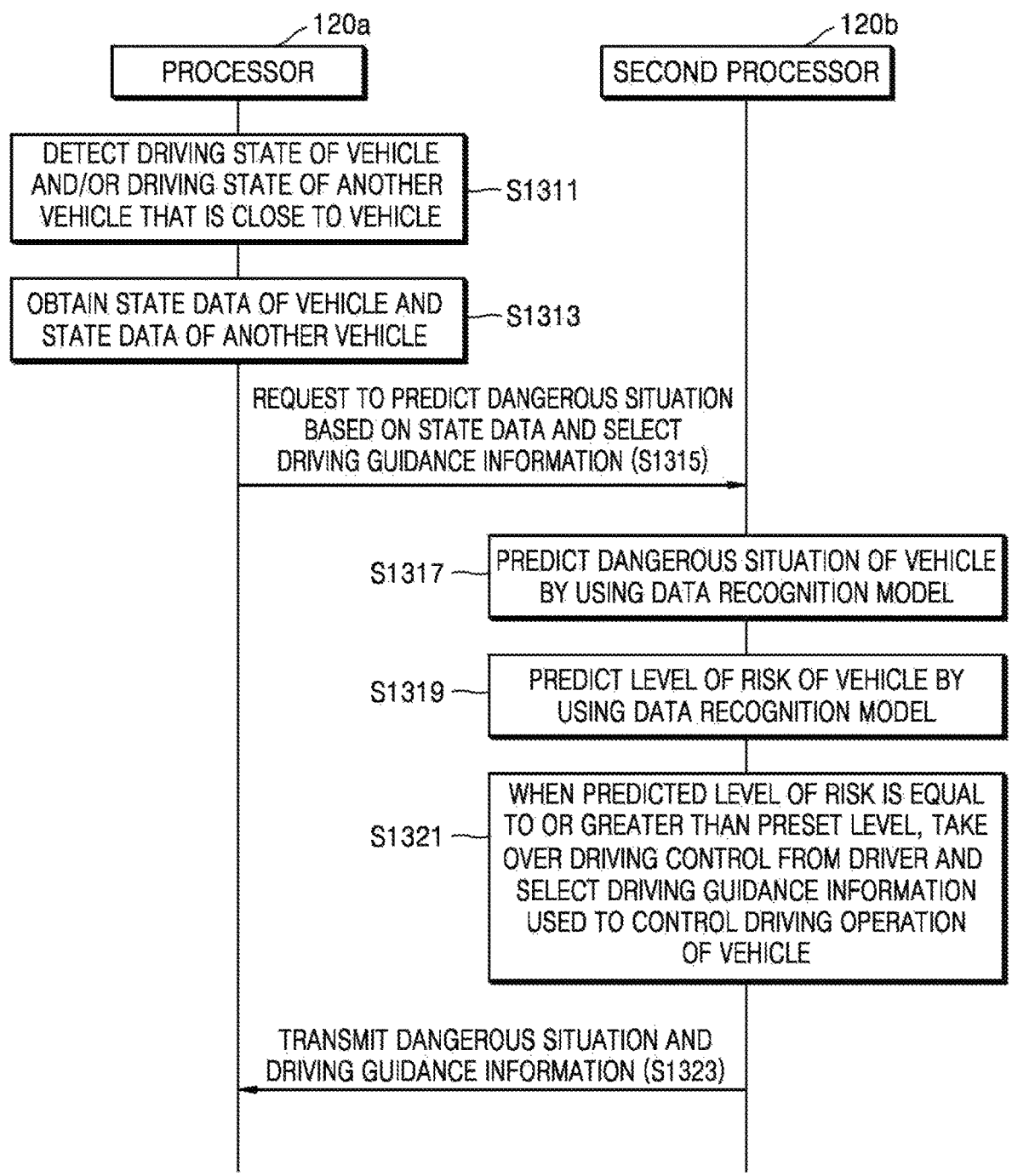
FIG. 13B is a flowchart for explaining a situation in which a first processor and a second processor control a driving operation of a vehicle, according to an embodiment of the present disclosure.

FIG. 13B is a flowchart for explaining a situation in which the first processor 120a and the second processor 120b control the driving operation of the vehicle, according to embodiment of the present disclosure.

Referring to FIG. 13B, the electronic apparatus 100 may include the first processor 120a and the second processor 120b.

In operation S1311, the first processor 120a may detect the driving state of the vehicle and/or the driving state of the other vehicle in the vicinity of the vehicle. Also, the first processor 120a may detect the state of the driver, the vehicle information of the other vehicle, and the surrounding environment information.

In operation S1313, the first processor 120a may obtain the state data of the vehicle and/or the state data of the other vehicle. Also, the first processor 120a may obtain state data regarding the state of the driver, the vehicle information of the other vehicle, and/or the surrounding environment information.

In operation S1315, the first processor 120a may request the second processor 120b to predict the dangerous situation based on the obtained state data and to select the driving guidance information.

For example, the first processor 120a may transmit, to the second processor 120b, the state data indicating that the driver is manipulating a smart phone, and the state data indicating that the traffic light in front of the vehicle has turned red.

In operation S1317, the second processor 120b may predict the dangerous situation of the vehicle by using the data recognition model.

For example, the second processor 120b may use the data recognition model to predict that there is a collision risk based on the state data regarding the driver and the traffic light.

In operation S1319, the second processor 120b may predict a level of risk regarding the dangerous situation of the vehicle by using the data recognition model. The level of risk may include, e.g., a level 1 to a level 10. When the level of risk exceeds a level 7, the second processor 120b may block a signal for controlling the operation of the vehicle by the driver and may generate the driving guidance information used to control the driving operation including at least one of the driving speed and the driving direction of the vehicle.

In operation S1321, when the predicted level of risk is equal to or greater than a preset level, the second processor 120b may take over driving control from the driver and may select driving guidance information used to control the driving operation of the vehicle.

For example, when the driver keeps manipulating the smart phone, and when a distance to the red traffic light is within about 10 m, the second processor 120b may set the level of risk to the level 8. In this case, the second processor 120b may block the signal for controlling the operation of the vehicle by the driver and may generate driving guidance information used to decrease the driving speed of the vehicle.

According to various embodiments, when the level of risk exceeds the level 8, the second processor 120b may further include a signal for changing a driving direction in the driving guidance information.

In operation S1323, the second processor 120b may transmit, to the first processor 120a, the predicted dangerous situation and the selected driving guidance information. The first processor 120a may drive the brakes of the vehicle to decelerate, thus preventing the collision between the vehicles, according to content (the dangerous situation and the driving guidance information) received from the second processor 120b.

Figure 13C:
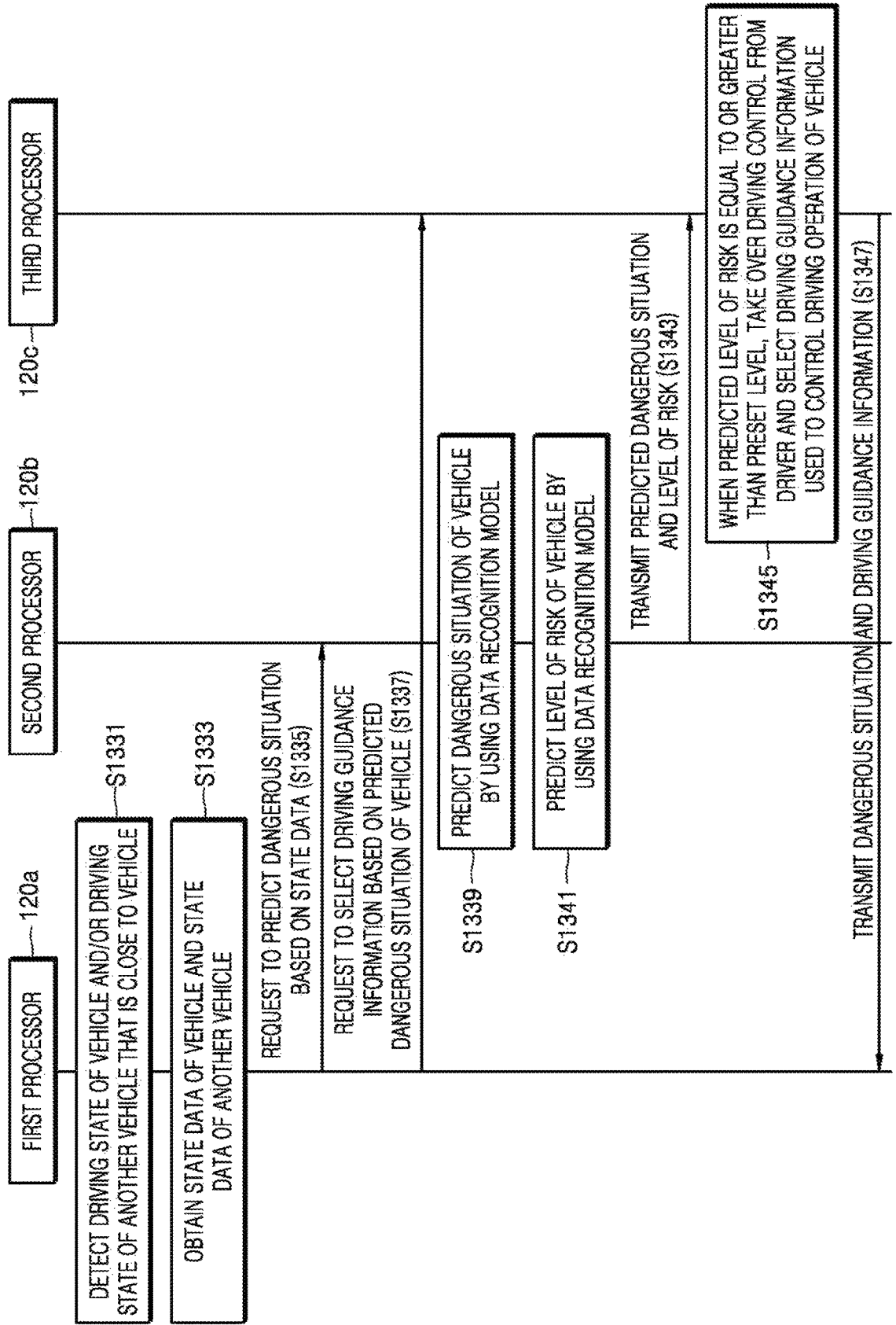
FIG. 13C is a flowchart for explaining a situation in which a first processor, a second processor, and a third processor control a driving operation of a vehicle, according to an embodiment of the present disclosure.

FIG. 13C is a flowchart for explaining a situation in which the first processor 120b, the second processor 120b, and the third processor 120c control the driving operation of the vehicle, according to embodiment of the present disclosure.

Referring to FIG. 13C, the electronic apparatus 100 may include the first processor 120b, the second processor 120b, and the third processor 120c. The third processor 120c may select the driving guidance information based on the level of risk regarding the dangerous situation of the vehicle.

In operation S1331, the first processor 120a may detect the driving state of the vehicle and/or the driving state of the other vehicle in the vicinity of the vehicle. Also, the first processor 120a may detect the state of the driver, the vehicle information of the other vehicle, and the surrounding environment information.

In operation S1333, the first processor 120a may obtain the state data of the vehicle and/or the state data of the other vehicle. Also, the first processor 120a may obtain the state data regarding the state of the driver, the vehicle information of the other vehicle, and/or the surrounding environment information.

In operation S1335, the first processor 120a may request the second processor 120b to predict the dangerous situation based on the obtained state data and to select driving guidance information.

For example, the first processor 120a may transmit, to the second processor 120b, the state data indicating that the driver is manipulating a smart phone, and the state data indicating that a traffic light in front of the vehicle has turned red.

In operation S1337, the first processor 120a may request the third processor 120c to select driving guidance information based on the level of risk regarding the dangerous situation of the vehicle.

In operation S1339, the second processor 120b may predict the dangerous situation of the vehicle by using the data recognition model.

For example, the second processor 120b may use the data recognition model to predict that there is a collision risk based on the state data regarding the driver and the traffic light.

In operation S1341, the second processor 120b may predict the level of risk regarding the dangerous situation of the vehicle by using the data recognition model. The level of risk may include, e.g., the level 1 to the level 10. When the level of risk exceeds the level 7, the second processor 120b may block the signal for controlling the operation of the vehicle by the driver and may generate the driving guidance information used to control the driving operation including at least one of the driving speed and the driving direction of the vehicle.

In operation S1343, the second processor 120b may transmit the predicted dangerous situation of the vehicle and the level of risk to the third processor 120c.

In operation S1345, when the predicted level of risk is equal to or greater than the preset level, the third processor 120c may take over driving control from the driver and may select the driving guidance information used to control the driving operation of the vehicle.

For example, when the driver keeps manipulating the smart phone, and when the distance to the red traffic light is within about 10 m, the third processor 120c may set the level of risk to the level 8. In this case, the third processor 120c may block the signal for controlling the operation of the vehicle by the driver, and may generate the driving guidance information used to decelerate the vehicle.

In operation S1347, the third processor 120c may transmit, to the first processor 120a, the predicted dangerous situation and the selected driving guidance information. The first processor 120a may drive the brakes of the vehicle to decelerate, thus preventing the collision between the vehicles, according to content (the dangerous situation and the driving guidance information) received from the third processor 120c.

Figure 13D:
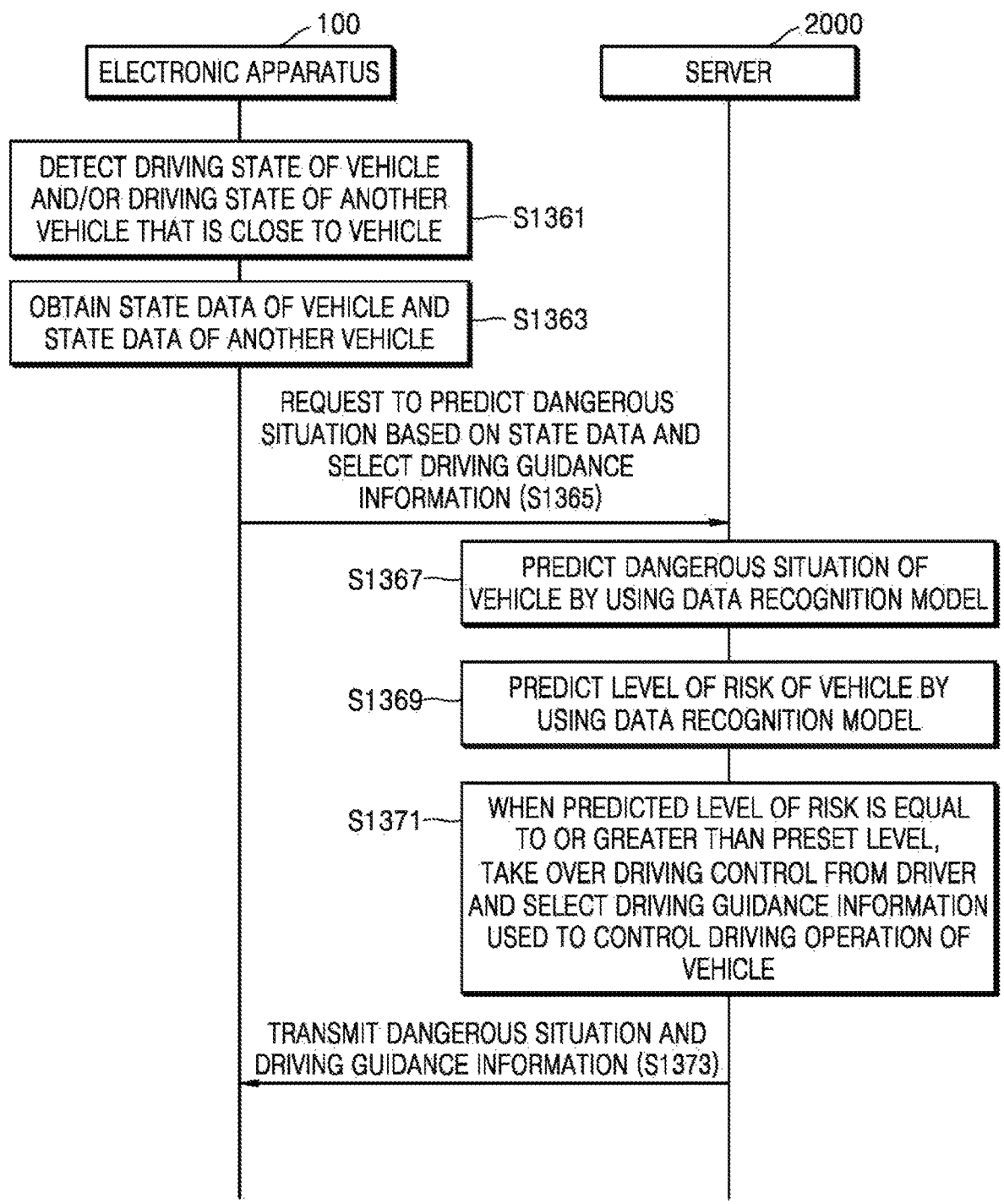
FIG. 13D is a flowchart for explaining a situation in which an electronic apparatus and a server control a driving operation of a vehicle, according to an embodiment of the present disclosure.

FIG. 13D is a flowchart for explaining a situation in which the electronic apparatus 100 and the server 2000 control the driving operation of the vehicle, according to various embodiment of the present disclosure.

Referring to FIG. 13D, the electronic apparatus 100 may control the driving operation of the vehicle by using the server 2000.

In operation S1361, the electronic apparatus 100 may detect the driving state of the vehicle and/or the driving state of the other vehicle in the vicinity of the vehicle. Also, the electronic apparatus 100 may detect the state of the driver, the vehicle information of the other vehicle, and the surrounding environment information.

In operation S1363, the electronic apparatus 100 may obtain the state data of the vehicle and/or the state data of the other vehicle. Also, the electronic apparatus 100 may obtain the state data regarding the state of the driver, the vehicle information of the other vehicle, and/or the surrounding environment information.

In operation S1365, the electronic apparatus 100 may request the server 2000 to predict the dangerous situation based on the obtained state data and to select driving guidance information.

For example, the electronic apparatus 100 may transmit, to the server 2000, the state data indicating that the driver is manipulating the smart phone, and the state data indicating that a traffic light in front of the vehicle has turned red.

In operation S1367, the server 2000 may predict the dangerous situation of the vehicle by using the data recognition model.

For example, the server 2000 may use the data recognition model to predict that there is a collision risk based on the state data regarding the driver and the traffic light.

In operation S1369, the server 2000 may predict the level of risk regarding the dangerous situation of the vehicle by using the data recognition model. The level of risk may include, e.g., the level 1 to the level 10. When the level of risk exceeds the level 7, the second processor 120b may block the signal for controlling the operation of the vehicle by the driver and may generate the driving guidance information used to control the driving operation including at least one of the driving speed and the driving direction of the vehicle.

In operation S1371, when the predicted level of risk is equal to or greater than the preset level, the server 2000 may take over driving control from the driver and may select the driving guidance information used to control the driving operation of the vehicle.

For example, when the driver keeps manipulating the smart phone, and when the distance to the red traffic light is within about 10 m, the server 2000 may set the level of risk to the level 8. In this case, the server 2000 may block the signal for controlling the operation of the vehicle by the driver and may generate the driving guidance information used to decelerate the vehicle.

In operation S1373, the server 2000 may transmit the predicted dangerous situation and the selected driving guidance information to the electronic apparatus 100. The electronic apparatus 100 may drive brakes of the vehicle to decelerate, thus preventing the collision between the vehicles, according to content (the dangerous situation and the driving guidance information) received from the server 2000.

Figure 14:
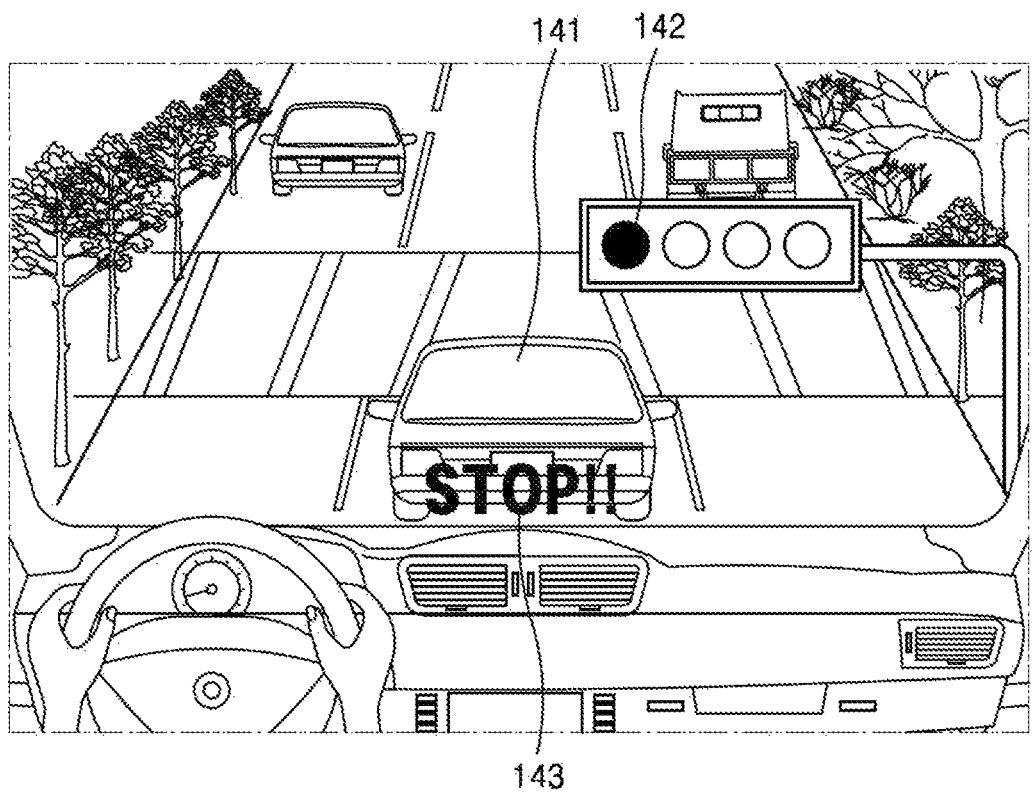
FIG. 14 illustrates an example in which an electronic apparatus controls a driving operation of a vehicle, according to an embodiment of the present disclosure.

FIG. 14 illustrates an example in which the electronic apparatus 100 controls a driving operation of the vehicle 1, according to an embodiment of the present disclosure.

Referring to FIG. 14, the sensor 110 of the electronic apparatus 100 may recognize a red traffic light ahead while the vehicle 1 is being driven. In this case, when the speed of the vehicle 1 is maintained, and when the driver of the vehicle 1 is dozing off, the electronic apparatus 100 may predict that the vehicle 1 may collide with a vehicle 141 in front of the vehicle 1 several seconds later.

The processor 120 according to an embodiment may determine driving guidance information used to prevent the collision with the vehicle 141. For example, the processor 120 may determine that the vehicle 1 needs to stop (e.g., at a red traffic light 142) so as to prevent the collision with the vehicle 141.

According to an embodiment, when the processor 120 determines that the vehicle 1 is reaching a threshold point, at which it will be impossible to prevent the collision, the processor 120, in consideration of braking and braking distance, may apply the brakes for hard braking.

Also, according to an embodiment, the processor 120 may display, on the head-up display, a warning message 143 (e.g., "STOP!!") requesting hard braking. Also, the processor 120 may output a warning sound through the sound output unit 282.

FIGS. 13A, 13B, 13C, and 13D and 14 illustrate an embodiment, but one or more embodiments of the present disclosure are not limited thereto.

Figure 15:
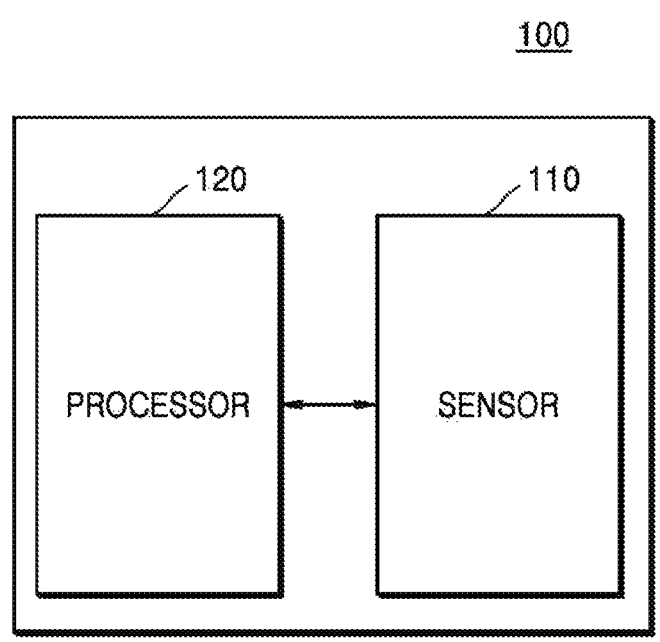
FIG. 15 is a block diagram of an electronic apparatus according to an embodiment of the present disclosure.

FIG. 15 is a block diagram of the electronic apparatus 100 according to an embodiment of the present disclosure.

Referring to FIG. 15, the electronic apparatus 100 may include the sensor 110 and the processor 120. FIG. 15 only illustrates the components of the electronic apparatus 100 which are related to the present embodiment. One of ordinary skill in the art may understand that the electronic apparatus 100 of FIG. 15 may further include other general-purpose components, other than the components illustrated in FIG. 15.

According to an embodiment, while the vehicle 1 is being driven, the sensor 110 may detect the driving state of the vehicle 1 and/or the driving state of the other vehicle in the vicinity of the vehicle 1.

The sensor 110 may include various sensors for detecting the driving state of the vehicle 1 or other vehicle. For example, the sensor 110 may include a distance sensor such as a LIDAR sensor or a RADAR sensor, and an image sensor such as a camera.

Also, the sensor 110 may include one or more actuators for correcting locations and/or orientations of various sensors, and may sense objects respectively positioned on the front, rear, and sides of the vehicle 1.

In addition, the sensor 110 may sense a shape of an object positioned in vicinity of the vehicle 1, a shape of road, etc. by using the image sensor.

According to an embodiment, the processor 120 may include at least one processor.

According to an embodiment, the processor 120 may obtain the state data including the driving state of the vehicle 1 and the driving state of the other vehicle driving in the vicinity of the vehicle 1. The processor 120 may use at least one data recognition model to determine the dangerous situation of the vehicle 1 after a certain period of time while the vehicle 1 is being driven, based on the obtained state data.

Also, the processor 120 may obtain the state data including the state of the driving that includes at least one of the facial expressions, the eye directions, and the actions of the driver who dries the vehicle 1 which are detected by the sensor 110.

In addition, the processor 120 may obtain the state data including the driving state of the vehicle 1 that includes at least one of the driving speed, the driving acceleration, and the driving direction of the vehicle 1.

Moreover, the processor 120 may obtain the vehicle information of the other vehicle from the image of the other vehicle and the state data including the vehicle information of the other vehicle.

Also, the processor 120 may obtain the state data including a state of road on which the vehicle 1 is being driven, or a surrounding environment state including weather conditions. The state of road and the surrounding environment state are detected by the sensor 110.

Also, the processor 120 may determine the driving guidance information used to prevent the determined dangerous situation of the vehicle 1 by using at least one data recognition model.

Also, the processor 120 may display at least one of the determined dangerous situation of the vehicle 1 and the driving guidance information used to prevent the determined dangerous situation.

Also, the processor 120 may use at least one data recognition model to determine, based on the obtained state data, the level of risk of the other vehicle driving in the vicinity of the vehicle 1, the level being capable of affecting the vehicle 1.

Also, the processor 120 may control the driving operation including at least one of the driving speed and the driving direction of the vehicle 1 based on the driving guidance information used to prevent the determined dangerous situation of the vehicle 1.

Also, when the determined level of risk regarding the dangerous situation of the vehicle 1 corresponds to a preset threshold value, the processor may take over control of the driving operation from the driver.

Also, as the processor 120 trains the dangerous situation of the vehicle 1, which is determined based on the state data, and the driving guidance information determined to prevent the dangerous situation, the processor 120 may update at least one data recognition model.

Also, as the processor 120 trains the dangerous situation of the vehicle 1 which is determined based on state data obtained by combining various states detected at close points in time, the processor 120 may update at least one data recognition model.

Figure 16:
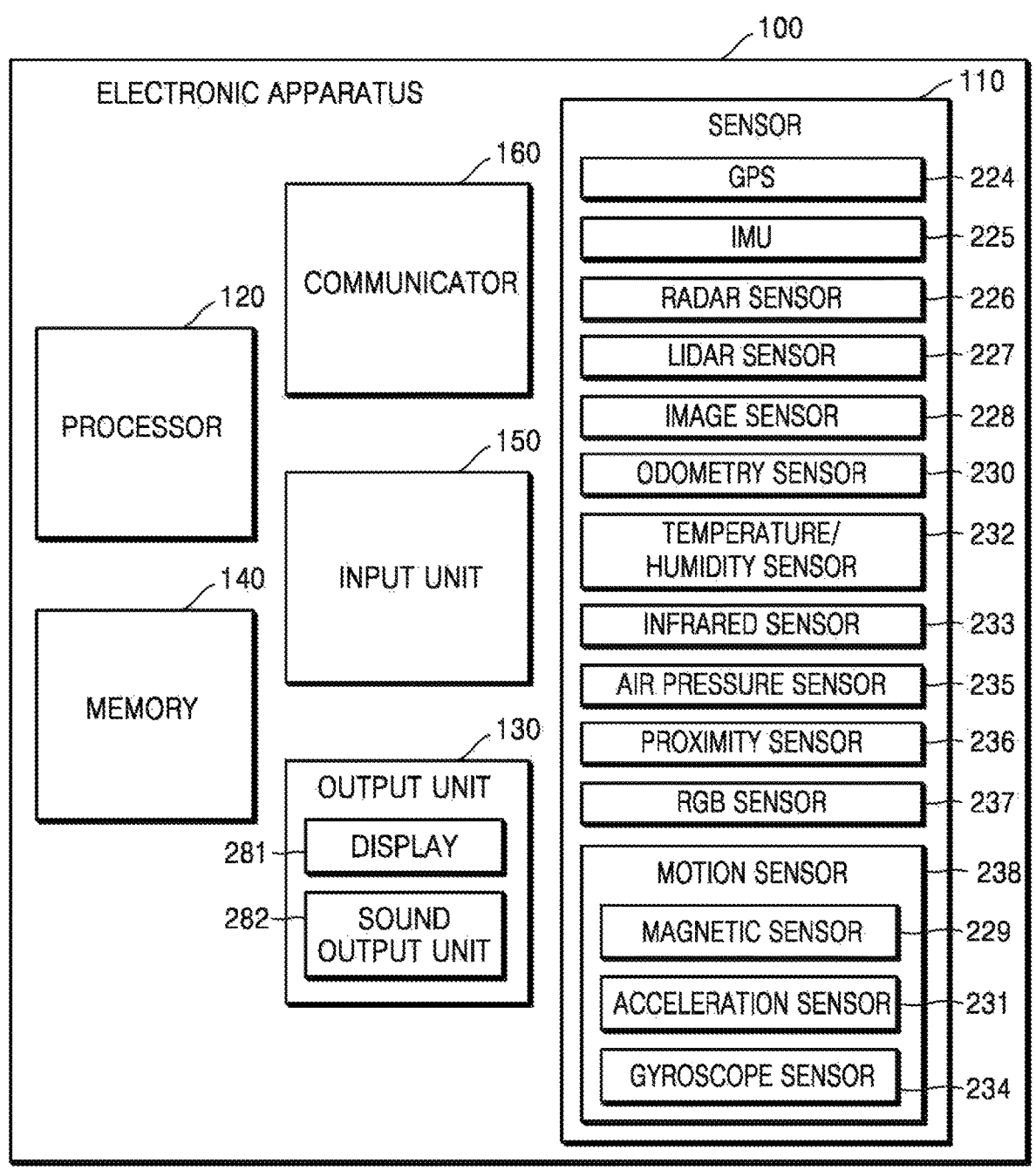
FIG. 16 is a block diagram of an electronic apparatus according to an embodiment of the present disclosure.

FIG. 16 is a block diagram of the electronic apparatus 100 according to an embodiment of the present disclosure.

Referring to FIG. 16, the electronic apparatus 100 may include the sensor 110, the processor 120, an output unit 130 (e.g., an output device), a memory 140 (e.g., a storage), an input unit 150 (e.g., an input device), and a communicator 160 (e.g., a transceiver).

The sensor 110 may include various sensors for detecting information about a surrounding environment of the vehicle 1, and one or more actuators for correcting locations and/or orientations of the sensors. For example, the sensor 110 may include a Global Positioning System (GPS) 224, the IMU 225, the RADAR sensor 226, the LIDAR sensor 227, the image sensor 228, and an odometry sensor 230. Also, the sensor 110 may include at least one of a temperature/humidity sensor 232, an infrared sensor 233, an air pressure sensor 235, a proximity sensor 236, and a red-green-blue (RGB) sensor (an illuminance sensor) 237, but the sensors are not limited thereto. Functions of such sensors may be intuitively inferred by one of ordinary skill in the art, and thus detailed descriptions thereof will be omitted herein.

Also, the sensor 110 may include a motion sensor 238 that may sense a movement of the vehicle 1. The motion sensor 238 may include a magnetic sensor 229, the acceleration sensor 231, and the gyroscope sensor 234.

The GPS 224 may predict a geographical location of the vehicle 1. That is, the GPS 224 may include a transceiver for predicting a geographical location of the vehicle 1 on the Earth.

The IMU 225 may be a combination of sensors for detecting changes in the location and orientation of the vehicle 1 based on inertial acceleration. For example, a combination of sensors may include accelerometers and gyroscopes.

The RADAR sensor 226 may use a wireless signal to detect objects in an environment where the vehicle 1 is positioned. Also, the RADAR sensor 226 may detect speed and/or directions of the objects.

The LIDAR sensor 227 may use laser beams to detect objects in an environment where the vehicle 1 is positioned. In more detail, the LIDAR sensor 227 may include a laser beam source and/or a laser scanner that emits laser beams, and a detector that detects reflection of the laser beams. The LIDAR sensor 227 may operate in a coherent detection mode (e.g., a mode of using heterodyne detection) or an incoherent detection mode.

The image sensor 228 may be a still camera or a video camera that records an environment outside the vehicle 1. For example, the image sensor 228 may include multiple cameras, and the cameras may be at locations inside and outside the vehicle 1.

The odometry sensor 230 may predict the location of the vehicle 1 and measure a movement distance. For example, the odometry sensor 230 may measure a location change value of the vehicle 1 based on the number of times that wheels of the vehicle 1 have rotated.

The memory 140 may include a magnetic disk drive, an optical disk drive, and flash memory. Alternatively, the memory 140 may be a portable universal serial bus (USB) data storage device. The memory 140 may store system software for executing examples related to the present disclosure. Such a system software may be stored in a portable storage medium.

The communicator 160 may include at least one antenna communicating with another device in a wireless manner. For example, the communicator 160 may be used to communicate with a cellular network or other wireless protocols and systems in a wireless manner via Wi-Fi or Bluetooth. The communicator 160 controlled by the processor 120 may transmit/receive a wireless signal. For example, the processor 120 may execute a program included in the memory 140 in such a manner that the communicator 160 transmits/receives a wireless signal to/from the cellular network.

The input unit 150 may be a medium that inputs data used to control the vehicle 1. For example, the input unit 150 may be a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but one or more embodiments of the present disclosure are not limited thereto. Also, the input unit 150 may include a microphone, and the microphone may receive audio (e.g., voice commands) from a passenger of the vehicle 1.

The output unit 130 may output an audio signal or a video signal. The output unit 130 may include at least one of a display 281 and the sound output unit 282.

The display 281 may include at least one of a liquid crystal display (LCD), a thin film transistor-liquid crystal display (TFT-LCD), an organic light-emitting diode (OLED) display, a flexible display, a 3-dimensional (3D) display, and an electrophoretic display. According to an implementation type of the output unit 130, the output unit 130 may include two or more displays 281.

The sound output unit 282 outputs audio data that is received from the communicator 160 or stored in the memory 140. Also, the sound output unit 282 may include a speaker, a buzzer, or the like.

The input unit 150 and the output unit 130 may each include a network interface and may be implemented as a touch screen.

The processor 120 may execute programs stored in the memory 140 and thus may control the sensor 110, the communicator 160, the input unit 150, the memory 140, and the output unit 130 overall.

Figure 17:
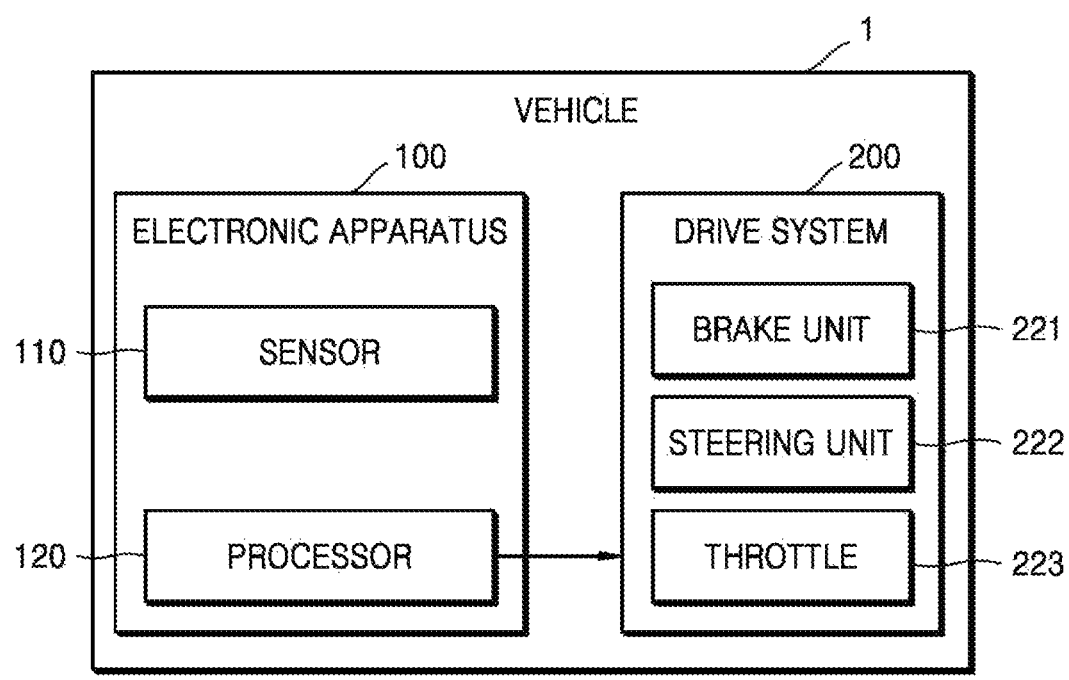
FIG. 17 is a block diagram of a vehicle according to an embodiment of the present disclosure.

FIG. 17 is a block diagram of the vehicle 1 according to an embodiment of the present disclosure.

Referring to FIG. 17, the vehicle 1 may include the electronic apparatus 100 and a drive system 200. The vehicle 1 of FIG. 17 only includes components that are related to the present embodiment. Thus, it is understood by one of ordinary skill in the art that the vehicle 1 of FIG. 17 may further include other general-purpose components, other than the components illustrated in FIG. 17.

The electronic apparatus 100 may include the sensor 110 and the processor 120.

The sensor 110 and the processor 120 have been described with reference to FIGS. 15 and 16, and detailed descriptions thereof will not be repeated.

The drive system 200 may include a brake unit 221 (e.g., a brake), a steering unit 222 (e.g., a steering device), and a throttle 223.

The steering unit 222 may be a combination of mechanisms configured to adjust a direction of the vehicle 1.

The throttle 223 may be a combination of mechanisms configured to control a driving speed of an engine/motor and thus control speed of the vehicle 1. Also, the throttle 223 may adjust an amount of a mixture gas of fuel air flowing into the engine/motor 211 and may control power and thrust by adjusting an opening ratio of the throttle 223.

The brake unit 221 may be a combination of mechanisms configured to decelerate the vehicle 1. For example, the brake unit 221 may use friction to decelerate wheels/tires.

Figure 18:
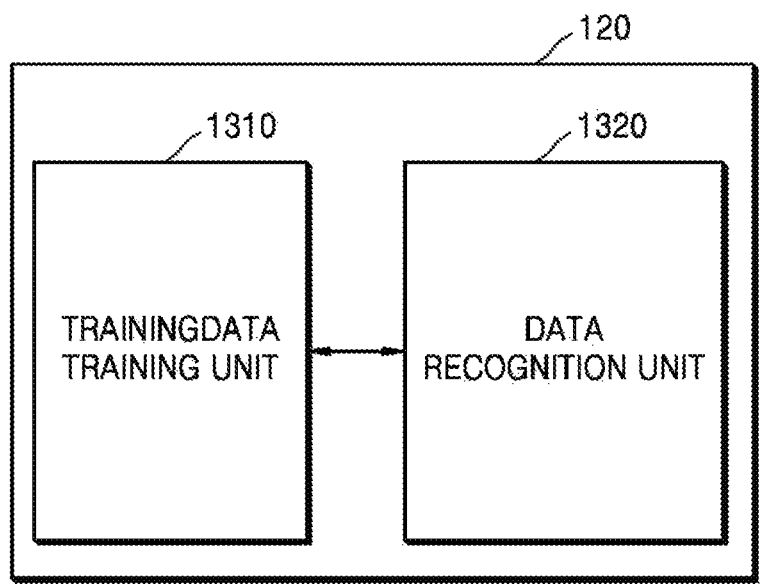
FIG. 18 is a block diagram of a processor according to an embodiment of the present disclosure.

FIG. 18 is a block diagram of the processor 120 according to an embodiment of the present disclosure.

FIG. 18 is a block diagram of the processor 120 according to some embodiments.

Referring to FIG. 18, the processor 120 according to some embodiments may include a data training unit 1310 (e.g., a data training device) and a data recognition unit 1320 (e.g., a data recognition device).

The data training unit 1310 may train standards for determining situations. The data training unit 1310 may train standards regarding which data is to be used to determine a certain situation and regarding how a situation is to be determined based on data. The data training unit 1310 may train the standards for determining situations by obtaining data used for training and applying the obtained data to a data recognition model to be described below.

The data recognition unit 1320 may determine a situation based on the data. The data recognition unit 1320 may use the data recognition model to recognize a situation from certain data. The data recognition unit 1320 may obtain certain data according to standards that are preset by training, and may use the data recognition model by using the obtained data as an input value, thereby determining a certain situation based on the certain data. Also, a value, which is output by the data recognition model by using the obtained data as the input value, may be used to update the data recognition model.

At least one of the data training unit 1310 and the data recognition unit 1320 may be manufactured as at least one hardware chip and mounted on the electronic apparatus 100. For example, at least one of the data training unit 1310 and the data recognition unit 1320 may be manufactured as a hardware chip exclusively used for AI or a part of an existing general-purpose processor (e.g., a CPU or an application processor (AP)) or a part of a processor exclusively used for graphics (e.g., a GPU) and thus may be mounted on the electronic apparatuses described above.

In this case, the data training unit 1310 and the data recognition unit 1320 may be mounted on one electronic apparatus. Alternatively, the data training unit 1310 and the data recognition unit 1320 may be mounted on separate electronic apparatuses, respectively. For example, one of the data training unit 1310 and the data recognition unit 1320 may be included in an electronic apparatus, and the other thereof may be included in a server. Also, the data training unit 1310 and the data recognition unit 1320 may provide the data recognition unit 1320 with model information constructed by the data training unit 1310 or may provide the data training unit 1310 with data, which is input to the data recognition unit 1320, as additional training data, in a wired or wireless manner.

At least one of the data training unit 1310 and the data recognition unit 1320 may be implemented as a software module. When at least one of the data training unit 1310 and the data recognition unit 1320 is implemented as a software module (or a program module including instructions), the software module may be stored in non-transitory computer readable media. Also, in this case, at least one software module may be provided by an operating system (OS) or a certain application. Alternatively, some of one or more software modules may be provided by an OS, and others thereof may be provided by a certain application.

Figure 19:
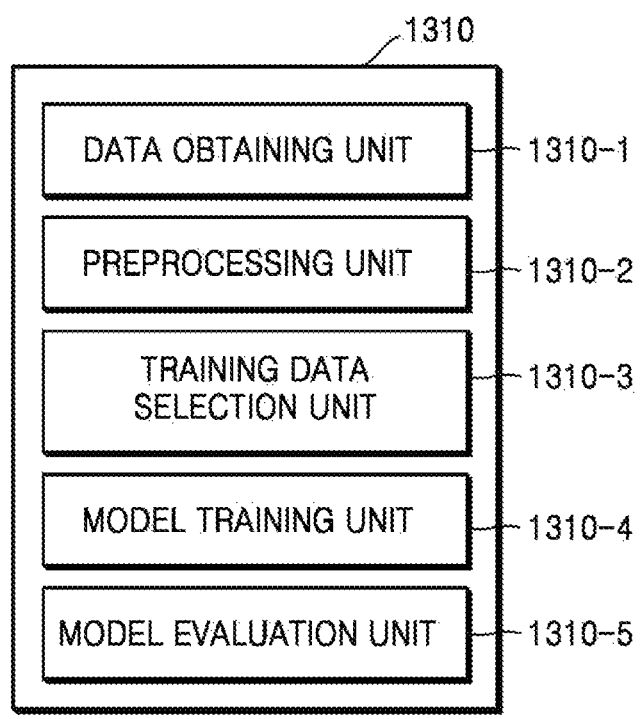
FIG. 19 is a block diagram of a data training unit according to an embodiment of the present disclosure.

FIG. 19 is a block diagram of the data training unit 1310 according to an embodiment of the present disclosure.

FIG. 19 is a block diagram of the data training unit 1310 according to some embodiments of the present disclosure.

Referring to FIG. 19, the data training unit 1310 according to some embodiments may include a data obtaining unit 1310-1 (e.g., a data obtainer) and a model training unit 1310-4 (e.g., a model trainer). Also, the data training unit 1310 may selectively include at least one of a preprocessing unit 1310-2 (e.g., a preprocessor), a training data selection unit 1310-3 (e.g., a training data selector), and a model evaluation unit 1310-5 (e.g., a model evaluator).

The data obtaining unit 1310-1 may obtain data necessary to determine a situation. The data obtaining unit 1310-1 may obtain data necessary for training for situation determination.

According to an embodiment, the data obtaining unit 1310-1 may obtain state data by detecting a driving state of a vehicle, a state of a driver, driving states of other vehicles, state information of the other vehicles, surrounding environment information, etc., all of which are necessary to determine a dangerous situation. Also, the data obtaining unit 1310-1 may receive the state data from a server.

According to an embodiment, the driving state of the vehicle and the state of the driver may be information of a vehicle that a driver drives. The driving states of the other vehicles and the state information of the other vehicles may be information about vehicles except for the vehicle that the driver drives.

For example, the data obtaining unit 1310-1 may receive images in the vicinity of the vehicle 1. Such images may include images (or frames). For example, the data obtaining unit 1310-1 may receive a moving image from a camera of an electronic apparatus including the data training unit 1310 or an external camera (e.g., a closed-circuit television (CCTV), a black box, or the like) capable of communicating with the electronic apparatus including the data training unit 1310. Here, the camera may include at least one image sensor (e.g., a front-facing sensor or a rear-facing sensor), a lens, an image signal processor (ISP), or flash (e.g., a light emitting diode (LED), a xenon lamp, or the like).

Also, for example, the data obtaining unit 1310-1 may obtain the driving states, the vehicle information, etc. of the other vehicles. For example, the data obtaining unit 1310-1 may receive data from an input device (e.g., a microphone, a camera, a sensor, or the like) of an electronic apparatus. Alternatively, the data obtaining unit 1310-1 may obtain data from an external device communicating with the electronic apparatus.

The model training unit 1310-4 may be trained to have determination standards regarding how the data recognition model determines a situation base on training data. Also, the model training unit 1310-4 may be trained to have classification standards regarding which data needs to be used by the data recognition model to determine a situation.

According to an embodiment, the model training unit 1310-4 may be trained to have determination standards regarding what kind of dangerous situations (e.g., whether there are dangerous situations and/or a level of risk) will be determined by the data recognition model based on state data including information about driving of the vehicle, information about driving of vehicles other than the vehicle, and the like. The information about the driving of the vehicle includes the driving state of the vehicle, the state of the driver, and the surrounding environment information, and the information about the driving of the other vehicles includes the driving states and the vehicle information of the other vehicles. Also, the model training unit 1310-4 may be trained to have determination standards regarding which driving guidance information (e.g., output of guidance information, hard braking, a direction change, and the like) will be provided based on the determined dangerous situations.

The driving state of the vehicle may include, for example, a driving speed, driving acceleration, a driving direction, hard braking, sudden acceleration, and the like. The state of the driver may include, for example, facial expressions, an eye direction, actions, and the like. The driving states of the other vehicles may include, for example, driving speeds, driving acceleration, driving directions, direction change intentions, hard braking, sudden acceleration, and the like. The vehicle information of the other vehicles may include, for example, vehicle models, years, potential accident rates, weights, insurance histories, and the like. The surrounding environment information may include, for example, types of lanes on road, weather conditions, road conditions, accident-prone areas, road-work areas, pedestrians, obstacles, and the like.

Also, the model training unit 1310-4 may use training data to train the data recognition model used to determine a situation. In this case, the data recognition model may be a model that is constructed in advance. For example, the data recognition model may be a model that is constructed in advance by receiving basic training data (e.g., sample images, etc.).

The data training unit 1310 may further include the preprocessing unit 1310-2, the training data selection unit 1310-3, and the model evaluation unit 1310-5 so as to improve a recognition result of the data recognition model or reduce resources or time required to generate the data recognition model.

The preprocessing unit 1310-2 may preprocess the obtained data to use the same for situation determination. The preprocessing unit 1310-2 may process the obtained data into a preset format such that the model training unit 1310-4 to be described below may use the data obtained for training for situation determination. For example, the preprocessing unit 1310-2 may generate one composite image by overlaying at least some portions of images based on common regions respectively included in the images (or frames) that form at least some portions of the received moving image. In this case, multiple composite images may be generated in one moving image. The common region may be a region of each image that includes the same or similar common objects (e.g., objects, animals, plants, human beings, etc.). Alternatively, the common region may be a region of each image where colors, shadows, RGB or cyan magenta yellow black (CMYK) values, etc. are the same or similar.

The training data selection unit 1310-3 may select data necessary for training from among preprocessed pieces of data. The selected data may be provided to the model training unit 1310-4. The training data selection unit 1310-3 may select the data necessary for training from among the preprocessed pieces of data, according to the standards that are preset to determine situations. Also, the training data selection unit 1310-3 may select data, according to standards that are preset by training of the model training unit 1310-4 to be described below.

For example, data regarding other vehicles, obstacles, pedestrians, etc., which may affect a driving path of the vehicle 1, may be selected. Also, for example, data regarding an image of a driver who does not drive but takes other actions may be selected.

The model evaluation unit 1310-5 may allow the model training unit 1310-4 to be trained again, when evaluation data is input to the data recognition model and a recognition result from the data recognition model does not satisfy a certain standard. In this case, the evaluation data may be data that is preset to evaluate the data recognition model.

For example, when the number or a ratio of pieces of the evaluation data, which do not produce accurate recognition results from among recognition results of the data recognition model with regard to the evaluation data, exceeds a preset threshold value, the model evaluation unit 1310-5 may determine that the recognition results fail to satisfy a certain standard. For example, when the certain standard is defined as about 2%, and when the data recognition model outputs wrong recognition results of the evaluation data which exceed 20 from among 1000 pieces of evaluation data, the model evaluation unit 1310-5 may determine that this data recognition model is not suitable.

When there are multiple trained data recognition models, each model evaluation unit 1310-5 may evaluate whether a trained moving image recognition model satisfies a certain standard and may determine, as a final data recognition model, the moving image recognition model that satisfies the certain standard. In this case, when there are multiple models that satisfy the certain standard, the model evaluation unit 1310-5 may determine, as a final data recognition model, any one of or a certain number of data recognition models that are predefined in an order of high to low scores.

The data recognition model may be constructed by considering a field to which the data recognition model is applied, a purpose of training, computer performance of an apparatus, and the like. The data recognition model may be, for example, a neural network-based model. For example, a model such as a DNN, an RNN or a bidirectional recurrent deep neural network (BRDNN) may be used as a data recognition model, but one or more embodiments are not limited thereto.

According to various embodiments, when there are multiple data recognition models that are constructed in advance, the model training unit 1310-4 may determine, as a data recognition model to be trained, a data recognition model having a high relevance between input training data and basic training data. In this case, the basic training data may be classified in advance according to types of data, and the data recognition models may be constructed in advance according to types of data. For example, the basic training data may be classified in advance according to various standards such as a region where training data is generated, a time when the training data is generated, a size of the training data, a genre of the training data, a producer of the training data, and types of objects in the training data.

Also, the model training unit 1310-4 may train the data recognition model by using a training algorithm including error back-propagation or gradient descent.

In addition, the model training unit 1310-4 may train the data recognition model by using, for example, supervised learning using the training data as an input value. The model training unit 1310-4 may train the data recognition model by using, for example, unsupervised learning that learns by itself types of data necessary to determine a situation without any supervision and thus finds a standard for determining a situation. Furthermore, the model training unit 1310-4 may train the data recognition model by using, for example, reinforcement learning using feedback regarding whether a situation determination result according to training is right.

Once the data recognition model is trained, the model training unit 1310-4 may store the trained data recognition model. In this case, the model training unit 1310-4 may store the trained data recognition model in a memory of the electronic apparatus including the data recognition unit 1320. Alternatively, the model training unit 1310-4 may store the trained data recognition model in the memory of the electronic apparatus including the data recognition unit 1320 to be described below. Alternatively, the model training unit 1310-4 may store the trained data recognition model in a memory of a server connected to the electronic apparatus via a wired or wireless network.

In this case, the memory, in which the trained data recognition model is stored, may also store, for example, commands or data regarding at least another component of the electronic apparatus. In addition, the memory may store software and/or a program. The program may include, for example, kernel, middle ware, an API, and/or an application program (or "application").

At least one of the data obtaining unit 1310-1, the preprocessing unit 1310-2, the training data selection unit 1310-3, the model training unit 1310-4, and the model evaluation unit 1310-5 of the data training unit 1310 may be manufactured as at least one hardware chip and mounted on the electronic apparatus. For example, at least one of the data obtaining unit 1310-1, the preprocessing unit 1310-2, the training data selection unit 1310-3, the model training unit 1310-4, and the model evaluation unit 1310-5 may be manufactured as a hardware chip exclusively used for AI or a part of an existing general-purpose processor (e.g., a CPU or an application processor (AP)) or a part of a processor exclusively used for graphics (e.g., a GPU) and thus may be mounted on the electronic apparatuses described above.

Also, the data obtaining unit 1310-1, the preprocessing unit 1310-2, the training data selection unit 1310-3, the model training unit 1310-4, and the model evaluation unit 1310-5 may be mounted on one electronic apparatus. Alternatively, the data obtaining unit 1310-1, the preprocessing unit 1310-2, the training data selection unit 1310-3, the model training unit 1310-4, and the model evaluation unit 1310-5 may be mounted on separate electronic apparatuses, respectively. For example, some of the data obtaining unit 1310-1, the preprocessing unit 1310-2, the training data selection unit 1310-3, the model training unit 1310-4, and the model evaluation unit 1310-5 may be included in the electronic apparatus, and others thereof may be included in the server.

In addition, at least one of the data obtaining unit 1310-1, the preprocessing unit 1310-2, the training data selection unit 1310-3, the model training unit 1310-4, and the model evaluation unit 1310-5 may be implemented as a software module. When at least one of the data obtaining unit 1310-1, the preprocessing unit 1310-2, the training data selection unit 1310-3, the model training unit 1310-4, and the model evaluation unit 1310-5 is implemented as a software module (or a program module including instructions), such a software module may be stored in a non-transitory computer readable medium. Also, in this case, at least one software module may be provided by an OS or a certain application.

Alternatively, some of the at least one software module may be provided by an OS, and others thereof may be provided by a certain application.

Figure 20:
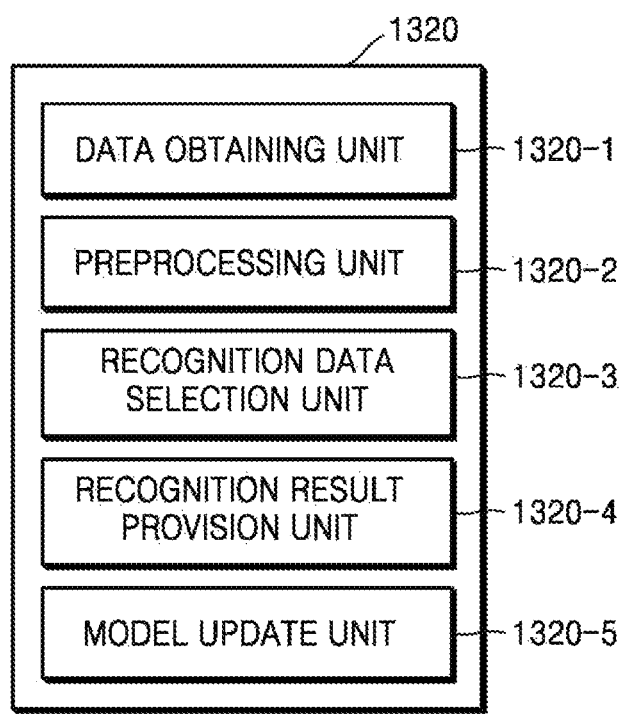
FIG. 20 is a block diagram of a data recognition unit according to an embodiment of the present disclosure.

FIG. 20 is a block diagram of the data recognition unit 1320 according to an embodiment of the present disclosure.

FIG. 20 is a block diagram of the data recognition unit 1320 according to some embodiments.

Referring to FIG. 20, the data recognition unit 1320 according to some embodiments may include a data obtaining unit 1320-1 (e.g., a data obtainer) and a recognition result provision unit 1320-4 (recognition result provider). Also, the data recognition unit 1320 may selectively include at least one of a preprocessing unit 1320-2 (e.g., a preprocessor), a recognition data selection unit 1320-3 (e.g., a recognition data selector), and a model update unit 1320-5 (e.g., a model updater).

The data obtaining unit 1320-1 may obtain data necessary to determine a situation.

A recognition result provision unit 1320-4 may determine a situation by applying the selected data to the data recognition model. The recognition result provision unit 1320-4 may provide a recognition result according to a recognition purpose of the data. The recognition result provision unit 1320-4 may use the data, which is selected by the recognition data selection unit 1320-3, as an input value and thus may apply the selected data to the data recognition model. Also, the recognition result may be determined by the data recognition model.

According to an embodiment, the recognition result provision unit 1320-4 may predict a dangerous situation (e.g., whether there is a dangerous situation and/or a level of risk) by using, as an input value, the state data including the driving state of the vehicle, the state of the driver, the driving states of the other vehicles, the vehicle information of the other vehicle, the surrounding environment information, and the like.

Also, the recognition result provision unit 1320-4 may provide the driving guidance information by using the predicted dangerous situation as an input value.

According to an embodiment, the driving guidance information according to the dangerous situation of the vehicle may be provided in a form of text, voice, a moving image, an image, or a command (e.g., an application execution command, a module function execution command, or the like). The recognition result provision unit 1320-4 may provide, as the driving guidance information according to the dangerous situation of the vehicle, "collision risk" or "risk of violation of the center line" in a form of text, voice, a moving image, or an image.

According to various embodiments, the recognition result provision unit 1320-4 may generate a signal for controlling the vehicle (e.g., hard braking, a direction change, etc.) according to the predicted dangerous situation of the vehicle.

The data recognition unit 1320 may further include the preprocessing unit 1320-2 (e.g., a preprocessor), the recognition data selection unit 1320-3, and the model update unit 1320-5 so as to improve a recognition result of the data recognition model or reduce resources or time required to generate the data recognition model.

The preprocessing unit 1320-2 may preprocess the obtained data to use the same for situation determination. The preprocessing unit 1320-2 may process the obtained data into a preset format such that the recognition result provision unit 1320-4 to be described below may use the data obtained for situation determination.

The recognition data selection unit 1320-3 may select data necessary for situation determination from among preprocessed pieces of data. The selected data may be provided to the recognition result provision unit 1320-4. The recognition data selection unit 1320-3 may select some or all of the preprocessed pieces of data, according to the standards that are preset to determine situations. Also, the recognition data selection unit 1320-3 may select data, according to standards that are preset by training of the model training unit 1310-4 to be described below.

The model update unit 1320-5 may update the data recognition model based on an evaluation on the recognition result provided by the recognition result provision unit 1320-4. For example, the model update unit 1320-5 may provide the model training unit 1310-4 with the recognition result provided by the recognition result provision unit 1320-4 such that the model training unit 1310-4 may update the data recognition model.

At least one of the data obtaining unit 1320-1, the preprocessing unit 1320-2, the recognition data selection unit 1320-3, the recognition result provision unit 1320-4, and the model update unit 1320-5 of the data recognition unit 1320 may be manufactured as at least one hardware chip and mounted on the electronic apparatus. For example, at least one of the data obtaining unit 1320-1, the preprocessing unit 1320-2, the recognition data selection unit 1320-3, the recognition result provision unit 1320-4, and the model update unit 1320-5 may be manufactured as a hardware chip exclusively used for AI or a part of an existing general-purpose processor (e.g., a CPU or an AP) or a part of a processor exclusively used for graphics (e.g., a GPU) and thus may be mounted on the electronic apparatuses described above.

Also, the data obtaining unit 1320-1, the preprocessing unit 1320-2, the recognition data selection unit 1320-3, the recognition result provision unit 1320-4, and the model update unit 1320-5 may be mounted on one electronic apparatus. Alternatively, the data obtaining unit 1320-1, the preprocessing unit 1320-2, the recognition data selection unit 1320-3, the recognition result provision unit 1320-4, and the model update unit 1320-5 may be mounted on separate electronic apparatuses, respectively. For example, some of the data obtaining unit 1320-1, the preprocessing unit 1320-2, the recognition data selection unit 1320-3, the recognition result provision unit 1320-4, and the model update unit 1320-5 may be included in the electronic apparatus, and the others thereof may be included in the server.

In addition, at least one of the data obtaining unit 1320-1, the preprocessing unit 1320-2, the recognition data selection unit 1320-3, the recognition result provision unit 1320-4, and the model update unit 1320-5 may be implemented as a software module. When at least one of the data obtaining unit 1320-1, the preprocessing unit 1320-2, the recognition data selection unit 1320-3, the recognition result provision unit 1320-4, and the model update unit 1320-5 is implemented as a software module (or a program module including instructions), the software module may be stored in a non-transitory computer readable medium. Also, in this case, at least one software module may be provided by an OS or a certain application. Alternatively, some of one or more software modules may be provided by an OS, and others thereof may be provided by a certain application.

Figure 21:
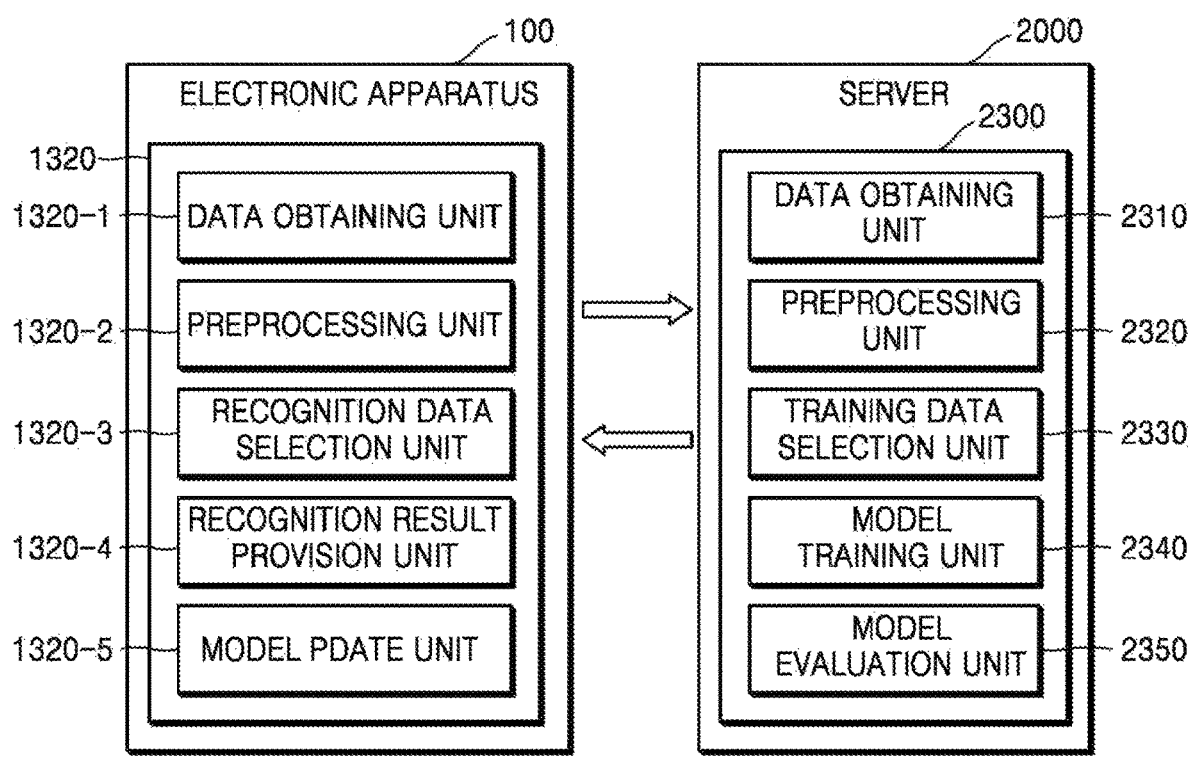
FIG. 21 is a block diagram of an example in which an electronic apparatus and a server interoperate with each other to train and recognize data, according to an embodiment of the present disclosure.

FIG. 21 is a block diagram of an example in which the electronic apparatus 100 and the server 2000 interoperate with each other to train and recognize data, according to an embodiment of the present disclosure.

FIG. 21 is a block diagram of an example in which the electronic apparatus 100 and the server 2000 interoperate with each other to train and recognize data, according to some embodiments of the present disclosure.

Referring to FIG. 21, the server 2000 may train standards to determine situations, and the electronic apparatus 100 may determine situations based on a training result of the server 2000. The server 2000 includes a data recognition unit 2300. The data recognition unit 2300 includes a data obtaining unit 2310, a preprocessing unit 2320, a training data selection unit 2330, a model training unit 2340, and a model evaluation unit 2350.

In this case, a model training unit 2340 (e.g., a model trainer) may perform a function of the data training unit 1310 of FIG. 19. The model training unit 2340 of the server 2000 may be trained to have the standards regarding which data is to be used to determine a certain situation and regarding how a situation is to be determined based on data. The model training unit 2340 may be trained to have the standards, which are used by the data recognition model to determine situations, by obtaining data used for training and applying the obtained data to the data recognition model to be described below.

Also, the recognition result provision unit 1320-4 of the electronic apparatus 100 may determine situations by applying the data selected by the recognition data selection unit 1320-3 to the data recognition model generated by the server 2000. For example, the recognition result provision unit 1320-4 may transmit the data selected by the recognition data selection unit 1320-3 to the server 2000 and may request the server 2000 to determine the situations by applying the data selected by the recognition data selection unit 1320-3 to the data recognition model. Moreover, the recognition result provision unit 1320-4 may receive information about the situations determined by the server 2000, from the server 2000.

For example, the electronic apparatus 100 may transmit, to the server 2000, the state data including the driving state of the vehicle, the state of the driver, and the driving states of the other vehicles in the vicinity of the vehicle, and may request the server 2000 to determine dangerous situations of the vehicle by applying the state data to the data recognition model. Also, the electronic apparatus 100 may receive, from the server 2000, information about the dangerous situations determined by the server 2000.

Alternatively, the recognition result provision unit 1320-4 of the electronic apparatus 100 may receive, from the server 2000, the data recognition model generated by the server 2000 and may determine the situations by using the received data recognition model. In this case, the recognition result provision unit 1320-4 of the electronic apparatus 100 may determine the situations by applying the data selected by the recognition data selection unit 1320-3 to the data recognition model received from the server 2000.

For example, the electronic apparatus 100 may apply the state data including the driving state of the vehicle, the state of the driver, and the driving states of the other vehicles in the vicinity of the vehicle, to the data recognition model received from the server 2000, thereby determining the dangerous situations of the vehicle 1.

An apparatus according to one or more embodiments may include a processor, a memory for storing and executing program data, a permanent storage medium such as a disk drive, a communication port communicating with an external device, a user interface device such as a touch panel, a key or a button, and the like. Methods implemented as software modules or algorithms may be stored as program instructions or computer readable codes executable on a processor on a non-transitory computer readable medium. Examples of the non-transitory computer readable recording medium include magnetic storage media (e.g., read only memory (ROM), random access memory (RAM) floppy disks, hard disks, etc.), and optical recording media (e.g., CD-ROMs, or digital versatile discs (DVDs)). The non-transitory computer readable recording medium can also be distributed over network coupled computer systems so that the computer readable code is stored and executed in a distributive manner. This media can be read by the computer, stored in the memory, and executed by the processor.

The one or more embodiments may be implemented as software programs including instructions stored in computer readable storage media.

The computer may be a device calling the stored instructions from the computer readable storage media and operating according to the instructions. The computer may include the electronic apparatus according to the one or more embodiments of the present disclosure.

The computer readable storage media may be provided as non-transitory computer readable storage media. Here, the term 'non-transitory' only indicates that the storage media do not include signals, but are tangible, and does not indicate that data is stored semi-permanently or temporarily.

Also, the control methods according to the one or more embodiments may be included in a computer program product. The computer program product may be exchanged between sellers and buyers as a product.

The computer program product may include a software program and a computer-readable recording medium having stored therein a software program. For example, the computer program product may include a product in a form of a software program (e.g., a downloadable application) that is electronically distributed by a manufacturer of an electronic apparatus or on an electronic market (e.g., Google Play Store, an Application store, etc.). For electronic distribution, at least some portions of the software program may be stored in a storage medium or may be temporarily generated. In this case, examples of the storage medium may include a server of the manufacturer, a server of the electronic market, or a storage medium of an intermediate server in which a software program is temporarily stored.

The computer program product may include a storage medium of a server or an electronic apparatus in a system including the server and the electronic apparatus. Alternatively, when a third device (e.g., a smart phone) that is communication-connected to the server or the electronic apparatus exists, the computer program product may include a storage medium of the third device. Alternatively, the computer program product may include a software program itself which is transmitted from the server to the electronic apparatus or the third device or from the third device to the electronic apparatus.

In this case, one of the server, the electronic apparatus, and the third device may execute the computer program product and thus may perform the method according to the one or more embodiments. Alternatively, two or more of the server, the electronic apparatus, and the third device may execute the computer program product and thus may perform, in a distributed manner, the method according to the one or more embodiments.

For example, the server (e.g., a cloud server, an AI server, or the like) executes the computer program product stored therein, and thus the electronic apparatus connected to the server may perform the method according to the one or more embodiments.

As another example, the third device executes the computer program product, and thus the electronic apparatus that is communication-connected to the third device may perform the method according to the one or more embodiments. When the third device executes the computer program product, the third device may download the computer program product from the server and may execute the downloaded computer product program. Alternatively, the third device may execute a computer program product that is preloaded and may perform the method according to the one or more embodiments.

The present disclosure may be described in terms of functional block components and various processing operations. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present disclosure could employ any number of techniques for electronics configuration, signal processing and/or control, data processing and the like according to the related art. The words "mechanism", "element", "means", and "configuration" are used broadly and are not limited to mechanical or physical embodiments, but can include software routines in conjunction with processors, etc.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a sensor configured to detect a first driving state of a first vehicle and a second driving state of a second vehicle in a vicinity of the first vehicle while the first vehicle is being driven;
a memory configured to store at least one instruction; and
at least one processor configured to execute the at least one instruction stored in the memory,
wherein, by executing the at least one instruction, the at least one processor is further configured to:
obtain state data based on the detected first driving state of the first vehicle and the detected second driving state of the second vehicle, and
predict, using a data recognition model, a dangerous situation of the first vehicle while the first vehicle is being driven, based on the obtained state data, wherein the at least one processor is further configured to train the data recognition model by using, as a training data, the obtained state data and the predicted dangerous situation of the first vehicle based on the obtained state data.

2. The electronic apparatus of claim 1,
wherein the sensor is further configured to detect a state of a driver who drives the first vehicle,
wherein the state of the driver comprises at least one of a facial expression, an eye direction, or an action of the driver, and
wherein, by executing the at least one instruction, the at least one processor is further configured to obtain the state data further comprising the detected state of the driver.

3. The electronic apparatus of claim 1, wherein the first driving state of the first vehicle comprises at least one of a driving speed, driving acceleration, or a driving direction of the first vehicle.

4. The electronic apparatus of claim 1,
wherein the sensor is further configured to obtain a captured image of the second vehicle driving in the vicinity of the first vehicle, and
wherein, by executing the at least one instruction, the at least one processor is further configured to:
obtain second vehicle information of the second vehicle from the captured image, and
obtain the state data further comprising the obtained second vehicle information of the second vehicle.

5. The electronic apparatus of claim 1,
wherein the sensor is further configured to detect a surrounding environment state,
wherein the surrounding environment state comprises:
a state of a road on which the first vehicle is being driven, or
a weather condition, and
wherein, by executing the at least one instruction, the at least one processor is further configured to obtain the state data further comprising the detected surrounding environment state.

6. The electronic apparatus of claim 1, wherein, by executing the at least one instruction, the at least one processor is further configured to predict, by using the data recognition model, driving guidance information for preventing the predicted dangerous situation of the first vehicle.

7. The electronic apparatus of claim 1, further comprising a display,
wherein, by executing the at least one instruction, the at least one processor is further configured to display at least one of the predicted dangerous situation or driving guidance information for preventing the predicted dangerous situation.

8. The electronic apparatus of claim 1,
wherein, by executing the at least one instruction, the at least one processor is further configured to determine, by using the data recognition model, a level of risk of the second vehicle which is driving in the vicinity of the first vehicle and affecting to the first vehicle, based on the obtained state data.

9. The electronic apparatus of claim 1, wherein, by executing the at least one instruction, the at least one processor is further configured to control a driving operation comprising at least one of a driving speed or a driving direction of the first vehicle based on driving guidance information for preventing the predicted dangerous situation of the first vehicle.

10. The electronic apparatus of claim 9, wherein, by executing the at least one instruction, when a level of risk of the predicted dangerous situation of the first vehicle corresponds to a preset threshold value, the at least one processor is further configured to take over control of the driving operation from a driver.

11. The electronic apparatus of claim 1,
wherein, by executing the at least one instruction,
the at least one processor is further configured to update the data recognition model by using, as a training data, the dangerous situation predicted based on the state data and a driving guidance information for preventing the predicted dangerous situation.

12. The electronic apparatus of claim 1,
wherein, by executing the at least one instruction,
the at least one processor is further configured to update the data recognition model by using, as a training data, the dangerous situation predicted based on state data obtained by combining a plurality of detected states.

13. The electronic apparatus of claim 1, wherein the at least one processor is further configured to:
predict the dangerous situation of the first vehicle by using at least one of a rule-based algorithm or an artificial intelligence (AI) algorithm.

14. A method of operating an electronic apparatus, the method comprising:
detecting a first driving state of a first vehicle and a second driving state of a second vehicle in a vicinity of the first vehicle while the first vehicle is being driven;
obtaining state data based on the detected first driving state of the first vehicle and the detected second driving state of the second vehicle; and
predicting, using a data recognition model, a dangerous situation of the first vehicle while the first vehicle is being driven, based on the obtained state data,
wherein the method further comprises training the data recognition model by using, as a training data, the obtained state data and the predicted dangerous situation of the first vehicle based on the obtained state data.

15. The method of claim 14, further comprising:
detecting a state of a driver who drives the first vehicle,
wherein the state of the driver comprises at least one of a facial expression, an eye direction, or an action of the driver, and
wherein the obtaining of the state data comprises obtaining the state data further comprising the detected state of the driver.

16. The method of claim 14, further comprising:
obtaining an image of the second vehicle driving in the vicinity of the first vehicle; and
obtaining second vehicle information of the second vehicle from the image of the second vehicle,
wherein the obtaining of the state data comprises obtaining the state data further comprising the obtained second vehicle information of the second vehicle.

17. The method of claim 14, further comprising:
predicting, by using the data recognition model, driving guidance information for preventing the predicted dangerous situation of the first vehicle.

18. The method of claim 14, further comprising:
displaying at least one of the predicted dangerous situation of the first vehicle or driving guidance information for preventing the predicted dangerous situation of the first vehicle.

19. The method of claim 14, further comprising:
controlling a driving operation using at least one of a driving speed or a driving direction of the first vehicle, based on driving guidance information for preventing the predicted dangerous situation of the first vehicle.

20. The method of claim 14, further comprising:
updating the data recognition model by using, as a training data, the dangerous situation predicted based on the state data obtained by combining a plurality of detected states.

* * * * *